United States Patent
Korus et al.

(10) Patent No.: US 9,042,223 B2
(45) Date of Patent: May 26, 2015

(54) METHOD AND APPARATUS FOR MULTIMEDIA BROADCAST MULTICAST SERVICE

(71) Applicant: MOTOROLA SOLUTIONS, INC., Schaumburg, IL (US)

(72) Inventors: Michael F. Korus, Eden Prairie, MN (US); Peter M. Drozt, Prairie Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 173 days.

(21) Appl. No.: 13/724,039

(22) Filed: Dec. 21, 2012

(65) Prior Publication Data

US 2014/0177436 A1 Jun. 26, 2014

(51) Int. Cl.
*H04W 72/04* (2009.01)
*H04W 4/06* (2009.01)
*H04W 72/00* (2009.01)
*H04W 76/00* (2009.01)
*H04L 12/18* (2006.01)

(52) U.S. Cl.
CPC .............. *H04W 4/06* (2013.01); *H04W 72/005* (2013.01); *H04L 12/189* (2013.01); *H04W 76/002* (2013.01)

(58) Field of Classification Search
USPC .......................................... 370/312, 390, 432
See application file for complete search history.

(56) References Cited

U.S. PATENT DOCUMENTS

| | | |
|---|---|---|
| 6,775,242 B2 | 8/2004 | Grilli et al. |
| 7,096,013 B1 | 8/2006 | Trandai et al. |
| 7,738,423 B2 | 6/2010 | Khan |
| 7,768,914 B2 | 8/2010 | Pauwels |
| 7,924,723 B2 | 4/2011 | Johnson et al. |
| 7,995,510 B2 | 8/2011 | Gao |

(Continued)

FOREIGN PATENT DOCUMENTS

| | | |
|---|---|---|
| CN | 101325791 A | 12/2008 |
| EP | 1581014 A1 | 9/2005 |

(Continued)

OTHER PUBLICATIONS

Alexiou, A. et al., "MBMS Multicast Mode of UMTS," Retrieved from the Internet URL: http://ru6.cti.gr/ru6/publications/2148HCNDS2007_MBMS_Bouras.pdf on Jul. 21, 2014, pp. 1-33.

(Continued)

*Primary Examiner* — Hoon J Chung
(74) *Attorney, Agent, or Firm* — Steven A. May

(57) ABSTRACT

A method and apparatus for assigning Multimedia Broadcast Multicast Service (E-MBMS) bearers in at least two Multimedia Broadcast Single Frequency Network (MBSFN) areas in a 3GPP compliant wireless communication system is provided. An infrastructure device receives identifiers of a primary preferred MBSFN area and a secondary preferred MBSFN area from a User Equipment (UE). The infrastructure device assigns a first E-MBMS bearer in a first MBSFN and a second E-MBMS bearer in a second MBSFN, to support a call to the UE, the first and second E-MBMS bearers providing the same media transmission to the UE as part of a group call. The infrastructure device may receive an attribute parameter comprising a request for Make Before Break service or a request for a boost to coverage, from the UE.

19 Claims, 12 Drawing Sheets

(56) References Cited

U.S. PATENT DOCUMENTS

| | | | |
|---|---|---|---|
| 8,085,783 | B2 | 12/2011 | Zhou et al. |
| 8,098,590 | B2 | 1/2012 | Catovic et al. |
| 8,135,418 | B2 | 3/2012 | Ranganathan et al. |
| 8,175,069 | B2 | 5/2012 | Wang et al. |
| 8,576,763 | B2 | 11/2013 | Gonsa et al. |
| 2003/0148779 | A1 | 8/2003 | Aravamudan et al. |
| 2003/0211859 | A1 | 11/2003 | Chen et al. |
| 2005/0227718 | A1 | 10/2005 | Harris et al. |
| 2005/0235289 | A1 | 10/2005 | Barillari et al. |
| 2005/0260997 | A1 | 11/2005 | Korale et al. |
| 2006/0034202 | A1 | 2/2006 | Kuure et al. |
| 2007/0133527 | A1 | 6/2007 | Kuure et al. |
| 2007/0153727 | A1 | 7/2007 | McBeath et al. |
| 2007/0264992 | A1 | 11/2007 | Maenpaa |
| 2007/0281722 | A1 | 12/2007 | Gao |
| 2008/0102811 | A1 | 5/2008 | Amirjoo et al. |
| 2008/0212583 | A1 | 9/2008 | Rey et al. |
| 2008/0267109 | A1 | 10/2008 | Wang et al. |
| 2008/0293428 | A1 | 11/2008 | Rey et al. |
| 2008/0311892 | A1 | 12/2008 | Lee et al. |
| 2009/0080363 | A1 | 3/2009 | Song et al. |
| 2009/0080451 | A1 | 3/2009 | Gogic |
| 2009/0103466 | A1 | 4/2009 | Gu et al. |
| 2009/0113487 | A1 | 4/2009 | Nanjunda Swamy |
| 2009/0207773 | A1 | 8/2009 | Feng et al. |
| 2009/0245155 | A1 | 10/2009 | Fukunaga et al. |
| 2009/0303909 | A1 | 12/2009 | Farhoudi et al. |
| 2009/0323574 | A1* | 12/2009 | Koskinen et al. ............ 370/312 |
| 2009/0323638 | A1 | 12/2009 | Catovic et al. |
| 2010/0027541 | A1 | 2/2010 | Eriksson et al. |
| 2010/0061308 | A1 | 3/2010 | Becker et al. |
| 2010/0081451 | A1 | 4/2010 | Mueck et al. |
| 2010/0128649 | A1 | 5/2010 | Gonsa et al. |
| 2010/0128722 | A1 | 5/2010 | Madour et al. |
| 2010/0157969 | A1 | 6/2010 | Swamy et al. |
| 2010/0222055 | A1 | 9/2010 | Cho et al. |
| 2010/0232340 | A1 | 9/2010 | Godor et al. |
| 2010/0265867 | A1 | 10/2010 | Becker et al. |
| 2010/0302988 | A1 | 12/2010 | Becker |
| 2010/0332610 | A1 | 12/2010 | Cherian et al. |
| 2011/0077006 | A1 | 3/2011 | Hsu |
| 2011/0128903 | A1 | 6/2011 | Futaki et al. |
| 2011/0145846 | A1 | 6/2011 | Kim |
| 2011/0149879 | A1 | 6/2011 | Noriega et al. |
| 2011/0151885 | A1 | 6/2011 | Buyukkoc et al. |
| 2011/0159880 | A1 | 6/2011 | Kumar et al. |
| 2011/0305183 | A1 | 12/2011 | Hsu et al. |
| 2011/0305184 | A1 | 12/2011 | Hsu |
| 2012/0008525 | A1 | 1/2012 | Koskinen |
| 2012/0014264 | A1 | 1/2012 | Wang |
| 2012/0033623 | A1 | 2/2012 | Chu et al. |
| 2012/0044907 | A1 | 2/2012 | Mildh |
| 2012/0170501 | A1 | 7/2012 | Drozt et al. |
| 2012/0170502 | A1 | 7/2012 | Korus et al. |
| 2012/0172028 | A1 | 7/2012 | Korus et al. |
| 2012/0230240 | A1 | 9/2012 | Nebat et al. |
| 2012/0236776 | A1 | 9/2012 | Zhang et al. |
| 2013/0064160 | A1 | 3/2013 | Newberg et al. |
| 2013/0301509 | A1 | 11/2013 | Purnadi et al. |
| 2014/0177437 | A1 | 6/2014 | Korus et al. |

FOREIGN PATENT DOCUMENTS

| | | | | |
|---|---|---|---|---|
| EP | 2302969 | A1 * | 3/2011 | ............ H04W 36/08 |
| WO | 02089501 | A1 | 11/2002 | |
| WO | 03098871 | A1 | 11/2003 | |
| WO | 2006027006 | A1 | 3/2006 | |
| WO | 2008123824 | A2 | 10/2008 | |
| WO | 2011000947 | A1 | 1/2011 | |
| WO | 2011068421 | A1 | 6/2011 | |

OTHER PUBLICATIONS

Ericsson et al., "MBMS Interest Indication for connected UEs," 3GPP Draft, R2-116190, 3rd Generation Partnership Project (3GPP), Mobile Competence Centre, vol. RAN WG2, No. San Francisco, USA, pp. 20111110-20111114, Nov. 8, 2011.

Final Office Action mailed Sep. 23, 2013 in U.S. Appl. No. 12/981,274, Michael F. Korus, filed Dec. 29, 2010.

Hallahan, R. and Peha, J.M., "Policies for Public Safety Use of Commercial Wireless Networks," 38th Telecommunications Policy Research Conference, Retrieved from the Internet URL: http://users.ece.cmu.edu/~peha/public_safety_priority_access.pdf on Jul. 21, 2014, pp. 1-34.

Hartung, F. et al., "MBMS—IP Multicast/Broadcast in 3G Networks," International Journal of Digital Multimedia Broadcasting, vol. 2009, (2009) Article ID 597848, pp. 1-25.

Huawei, "Stage 2 agreements on service continuity and location information for MBMS for LTE," 3GPP Draft, R2-115596, 3rd Generation Partnership Project (3GPP), Mobile Competence Centre, vol. RAN WG2, No. Zhuhai; 20111010, Oct. 26, 2011.

International Search Report for counterpart International Patent Application No. PCT/US2013/071828 mailed on May 13, 2014.

International Search Report for counterpart International Patent Application No. PCT/US2013/071837 mailed on May 13, 2014.

Non-Final Office Action mailed Mar. 1, 2013 in U.S. Appl. No. 12/981,274, Michael F. Korus et al., filed Dec. 29, 2010.

Non-Final Office Action mailed Apr. 17, 2014 in U.S. Appl. No. 13/231,530, Donald G. Newberg et al., filed Sep. 13, 2011.

Non-Final Office Action mailed Jun. 4, 2014 in U.S. Appl. No. 12/981,323, filed Dec. 29, 2010.

Notice of Allowance mailed May 21, 2014 in U.S. Appl. No. 13/724,098, Michael F. Korus et al., filed Dec. 21, 2012.

Qualcomm Europe, "Qualcomm proposal for E-UTRAN Architecture and Protocols," 3GPP Draft, R2-052921, 3rd Generation Partnership Project (3GPP), Mobile Competence Centre, vol. RAN WG2, No. Seoul, Korea; 20051102, Nov. 2, 2005.

Final Office Action mailed Apr. 25, 2013 in related U.S. Appl. No. 12/981,323, Michael F. Korus, filed Dec. 29, 2010.

Final Office Action mailed Apr. 15, 2013 in related U.S. Appl. No. 12/981,226, filed Dec. 29, 2010.

Open Mobile Alliance Standard "OMA-TS-PoC_MULTICAST_PoC-V2.1-20091222-C"; December 22, 2009; Sections 6 and 7; pp. 23-27.

3GPP TS 26.346 V.9.4.0; "3RD Generation Partnership Project; Technical Specification Group Services and System Aspects; Multimedia Broadcast/Multicast Service (MBMS); Protocols and Codecs, Release 9"; Sections 5.4.1 and 8; Sep. 2010.

3GPP TS 23.246 V.9.5.0; 3rd Generation Partnership Project; Technical Specification Group Services and System Aspects; Multimedia Broadcast/Multicast Service (MBMS); Architecture and Functional Description, Release 9; Sections 4.4.3, 4.4.4, and 8; Jun. 2010.

3GPP TSG RAN WG3 #59bis; "E-MBS Functions of Statistical Multiplexing"; R2-074339; Oct. 8-12, 2007; Shanghai, China; 8 Pages.

International Search Report and Written Opinion for related counterpart International Patent Application No. PCT/US2011/067354 mailed on Mar. 21, 2012.

International Search Report and Written Opinion for related counterpart International Patent Application No. PCT/US2011/066709 mailed on Jul. 6, 2012.

International Search Report and Written Opinion for related counterpart International Patent Application No. PCT/US2012/053051 mailed on Nov. 26, 2012.

Non Final Office Action mailed Oct. 26, 2012 in related U.S. Appl. No. 12/981,226, filed Dec. 29, 2010.

Non Final Office Action mailed Oct. 26, 2012 in related U.S. Appl. No. 12/981,323, Michael F. Korus, filed Dec. 29, 2010.

Non Final Office Action mailed Nov. 8, 2012 in related U.S. Appl. No. 12/981,274, Michael F. Korus, filed Dec. 29, 2010.

(56) References Cited

OTHER PUBLICATIONS

International Search Report and Written Opinion for counterpart International Patent Application No. PCT/US2011/066705 mailed on Jan. 18, 2013.

3rd Generation Partnership Project (3GPP), "3GPP TS 26.246 V9.0.0: Technical Specification Group Services and System Aspects; Transparent end-to-end packet switched streaming service (PSS); 3GPP SMIL Language Profile (Release 9)," 3GPP Standard, pp. 1-17, Dec. 10, 2009.

Open Mobile Alliance: "Poc User Plane Approved Version 1.0.3," OMA-TS-PoC_UserPlane-V1_0_3-20090922-A, pp. 1-12, Sep. 22, 2009.

Open Mobile Alliance: "OMA PoC Control Plane Approved Version 1.0.3," OMA-TS-PoC_ControlPlane-V1_0_3-20090922-A, pp. 1-8, Sep. 22, 2009.

Rosenberg, J. et al., "SIP: Session Initiation Protocol," RFC 3261, Network Working Group Request for Comments, pp. 14, Jun. 1, 2002.

Non Final Rejection mailed Mar. 3, 2013 in related U.S. Appl. No. 12/981,374, Michael F. Korus, filed Dec. 29, 2010.

"Multimedia Broadcast and Multicast Services in 3G Mobile Netowrks," Alcatel Telecommunications Revenues, pp. 1-12, Apr. 1, 2004.

* cited by examiner

| UE LOCATION | SITUATION/STATUS OF UE | MBSFN AREA ID(S) THAT UE REPORTS | PREFERENCES THAT UE REPORTS | ATTRIBUTES THAT UE REPORTS |
|---|---|---|---|---|
| 210 | STATIONARY | MBSFN AREA 230 | NONE. MBSFN AREA 230 IS BY DEFAULT THE PRIMARY PREFERRED MBSFN AREA | NONE |
| 214 | STATIONARY, AT AN INCIDENT SCENE | MBSFN AREAS 230 AND 240 | MBSFN AREA 230 IS THE PRIMARY PREFERRED MBSFN AREA. MBSFN AREA 240 IS THE SECONDARY PREFERRED MBSFN AREA. | COVERAGE BOOST REQUEST |
| 216 | MOVING | MBSFN AREAS 230, 240 AND 250 | MBSFN AREA 230 IS THE PRIMARY PREFERRED MBSFN AREA. MBSFN AREA 240 IS THE SECONDARY PREFERRED MBSFN AREA. MBSFN AREA 250 IS THE TERNARY PREFERRED MBSFN AREA. | MAKE BEFORE BREAK SERVICE REQUEST, TO SUPPORT MOBILITY OF UE |
| 218 | MOVING | MBSFN AREA 240 | NONE. MBSFN AREA 240 HAS SUFFICIENT SIGNAL STRENGTH THAT THE UE ONLY REPORTS ONEMBSFN AREA ID. | NONE |
| 220 | STATIONARY | MBSFN AREA 240 | NONE. MBSFN AREA 240 IS BY DEFAULT THE PRIMARY PREFERRED MBSFN AREA | NONE |

*FIG. 3*

| | MBSFN AREA 1 | MBSFN AREA 2 | MBSFN AREA 3 | MBSFN AREA 4 |
|---|---|---|---|---|
| UEA | PRIMARY | SECONDARY | | |
| UEB | PRIMARY | | SECONDARY | |
| UEC | PRIMARY | SECONDARY | | |
| UED | PRIMARY | | SECONDARY | SECONDARY |
| UEE | PRIMARY | | | |
| MBSFN CAPACITY | AVAILABLE | AVAILABLE | FULL | AVAILABLE |

FIG. 5

|  | MBSFN AREA 1 | MBSFN AREA 2 | MBSFN AREA 3 | MBSFN AREA 4 | MBB | BOOST |
|---|---|---|---|---|---|---|
| UEA | PRIMARY | SECONDARY | | | NO | BOOST |
| UEB | PRIMARY | | SECONDARY | | NO | NO |
| UEC | PRIMARY | SECONDARY | | | NO | BOOST |
| UED | PRIMARY | | | SECONDARY | MBB | NO |
| UEE | PRIMARY | | SECONDARY | | NO | NO |
| UEF | PRIMARY | | | SECONDARY | NO | NO |
| MBSFN CAPACITY | AVAILABLE | AVAILABLE | FULL | AVAILABLE | | |

*FIG. 6*

METHOD AND APPARATUS FOR MULTIMEDIA BROADCAST MULTICAST SERVICE

RELATED APPLICATIONS

The present application is related to the following U.S. applications commonly owned with this application by Motorola Solutions, Inc.: Application Publication No. US2012/0172028, Publication Date, Jul. 5, 2012, titled "METHODS FOR ASSIGNING A PLETHORA OF GROUP COMMUNICATIONS AMONG A LIMITED NUMBER OF PRE-ESTABLISHED MBMS BEARERS IN A COMMUNICATION SYSTEM" by Korus, et al.; Application Publication No. US2012/0170501, Publication Date, Jul. 5, 2012, titled "METHODS FOR TRANSPORTING A PLURALITY OF MEDIA STREAMS OVER A SHARED MBMS BEARER IN A 3GPP COMPLIANT COMMUNICATION SYSTEM"; by Drozt, et al.; application Ser. No. 13/724,098, filed on the same date as the present application, titled "METHOD AND APPARATUS FOR MULTIMEDIA BROADCAST MULTICAST SERVICE COVERAGE BOOST", by Korus, et al., the entire contents of each being incorporated herein by reference.

FIELD OF THE DISCLOSURE

The present disclosure relates generally to Multimedia Broadcast Multicast Services (MBMS), and more particularly to a method and apparatus for improving the reception of a Multimedia Broadcast Multicast Service by mobile communication units.

BACKGROUND

Long Term Evolution (LTE) is a radio technology designed to increase the capacity and speed of mobile communication networks. LTE provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by the 3rd Generation Partnership Project (3GPP).

LTE, in part, provides for a flat, IP-based network architecture designed to ensure support for, and mobility between, some legacy or non-3GPP systems such as, for instance, GPRS (general packet radio service) and WiMAX (Worldwide Interoperability for Microwave Access). Some of the main, advantages with LTE are high throughput, low latency, plug and play, FDD (frequency-division duplex) and TDD (time-division duplex) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®. Many major carriers in the United States (US) and several worldwide carriers have started to convert their networks to LTE.

LTE and other 3GPP compliant systems (meaning systems having elements that operate in compliance with 3GPP TSs) also provide Multimedia Broadcast Multicast Service (MBMS) point-to-multipoint transport of media to user equipment (UE) operating on the system. MBMS operation allows a defined set of LTE cells to "simulcast" bit for bit identical information in a Multicast Broadcast Single Frequency Network (MBSFN). This simulcast of information provides constructive RF interferences over a wide area, improving both coverage and performance when many endpoints desire to receive the same content. A UE can receive MBMS content either in connected mode or idle mode.

Starting in 3GPP release 8, MBMS is now referred to as E-MBMS (Evolved MBMS) to distinguish it from previous 3GPP architectures. Similarly, there are changes to the name of the Radio Access Network (RAN), i.e. the UTRAN becomes the E-UTRAN, and the core, i.e. this becomes the Evolved Packet Core (EPC). A multi-cell E-MBMS transmission provides a transmission of bit for bit identical information at exactly the same time and frequency, and is also referred to as an MBSFN transmission (Multicast Broadcast Single Frequency Network transmission). An alternative, generic industry terra for such a simulcast transmission is an 'SFN transmission', but the term MBSFN transmission will be used henceforth. Cells are configured to belong to a MBSFN Area. All cells that belong to a defined MBSFN area, and which participate in a MBSFN transmission, will transmit E-MBMS media (media content) at exactly the same time and frequency. As a consequence, all cells simulcast bit for bit identical information at exactly the same time and frequency.

Unfortunately, the E-MBMS transport mechanisms that are described in the 3GPP TSs have many shortcomings when applied to mission critical group communications. However, if organizations having more stringent requirements for media transport are going to use 3GPP E-MBMS technology, it is desirable for these systems to provide enhanced coverage and performance.

In 3GPP compliant systems, handover applies to connected mode only UEs, in which the cell mobility event is controlled by the network. On the other hand, cell re-selection applies to idle mode UEs, and is performed entirely by the UE. With cell re-selection by an idle mode UE, the network is neither involved nor aware.

Accordingly, there is a need for enhancements to Multimedia Broadcast Multicast Services.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a table illustrating values that may be reported by UEs.

FIG. 5 is a table illustrating one example of a call group.

FIG. 6 is a table illustrating another example of a call group.

Figure 1:
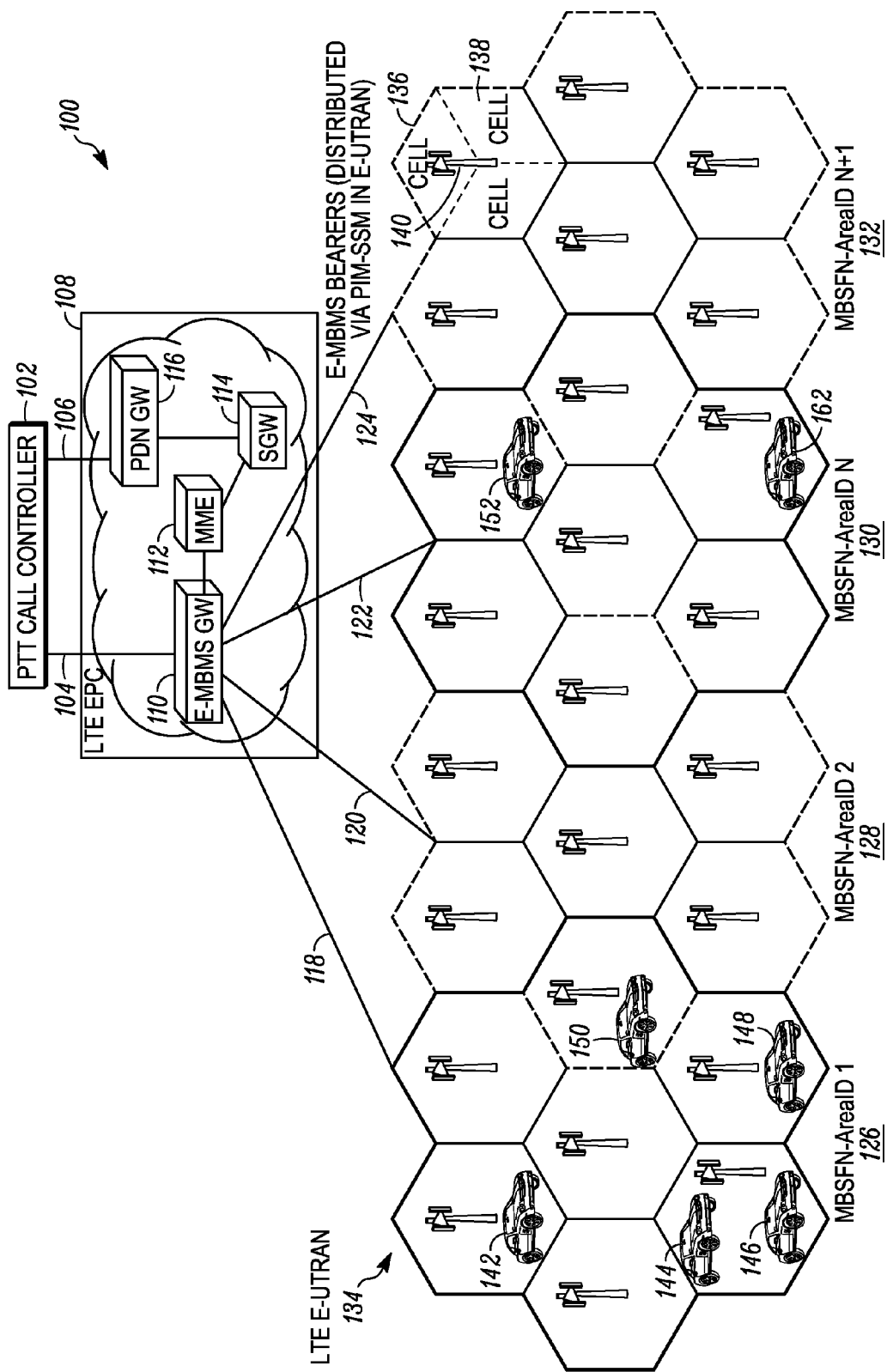
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of assigning Multimedia Broadcast Multicast Service (E-MBMS) bearers in at least two Multimedia Broadcast Single Frequency Network (MBSFN) areas in a Third Generation Partnership Project (3GPP) compliant wireless communication system is provided. An infrastructure device is operably coupled to the 3GPP compliant system, the 3GPP compliant system having a radio access network partitioned into a plurality of MBSFN areas, wherein each MBSFN area supports a plurality of E-MBMS bearers for transporting media streams to user equipments (UE). The infrastructure device uses application layer processing to perform receiving information from a UE, the information comprising an identifier that identifies a primary preferred MBSFN area that provides signals to the UE, and an identifier that identifies a secondary preferred MBSFN area that provides signals to the UE. The infrastructure device assigns a first E-MBMS bearer in a first MBSFN area and a second E-MBMS bearer in a second MBSFN area, to support a call to the UE, the first and second E-MBMS bearers providing the same media content to the UE, wherein the infrastructure device uses the information from the UE in the assignment.

When a first E-MBMS bearer in a first MBSFN area and a second E-MBMS bearer in a second MBSFN area are assigned, to support a call to the UE, the first MBSFN area and the second MBSFN area may use different subframe resources to make this possible. More generally, the first E-MBMS bearer and the second E-MBMS bearer, may be offset in time. This timing offset allows the UE to receive the first E-MBMS bearer and the second E-MBMS bearer simultaneously. Reception by a UE from more than two neighboring/overlapping MBSFN areas is possible, when the E-MBMS bearers from the more than two areas are each offset in time.

The infrastructure device may receive an attribute parameter from the UE, the attribute parameter comprising a request for a Make Before Break (MBB) service, and may assign the first MBSFN area and first E-MBMS bearer, and the second MBSFN area and second E-MBMS bearer, also at least partly on the basis of the request for the MBB service. The attribute parameter from the UE may also or instead comprise a request for a boost to coverage, and the infrastructure device may assign the first MBSFN area and first E-MBMS bearer, and the second MBSFN area and second E-MBMS bearer, also based at least partly on the request for a boost to coverage. The UE may transmit the attribute parameter at the same time as it transmits the identifiers that identify the primary and secondary preferred MBSFN areas. However, the UE may also transmit the attribute parameter some time after it transmits the identifiers. If the UE transmits the attribute parameter some time after it transmits the identifiers, then the infrastructure device may assign an additional E-MBMS bearer some time after it assigns the first E-MBMS bearer. Reference to a boost to 'coverage' may include any improvement in reception by a UE, including received signal strength or quality.

A method for a UE to receive a E-MBMS service in a 3GPP compliant wireless communication system, comprises a UE performing: receiving at least two content streams comprising the same information, a first content stream being received on a first E-MBMS bearer in a first MBSFN area and a second content stream being received on a second E-MBMS bearer in a second MBSFN area; time aligning the at least two content streams; using header information to detect missing packets from each content stream; and combining packets from each E-MBMS bearer, to construct a single content stream having the information.

FIG. 1 is a communication system in accordance with some embodiments, shown and indicated generally at System 100 includes system elements of: an infrastructure device 102 such as an application server (that is illustrated as a Push-to-Talk (PTT) Controller); and an LTE Evolved Packet Core (EPC) 108 (having a Mobility Management Entity (MME) 112, a E-MBMS Gateway (E-MBMS GW) 110, a Serving Gateway (SGW) 114, and a Packet Data Network Gateway (PDN GW) 116. Other elements of an LTE EPC are not included for ease of illustration. An example would be a Broadcast Multicast Service Center (BM-SC), which could be located within the EPC or alternatively within the application server.

System 100 further includes elements of: an access network (in this case an LTE Evolved Universal Terrestrial Radio Access Network (E-UTRAN)) 134 that includes a plurality of eNodeBs (LTE base station) infrastructure devices (with one labelled as 140); and a plurality of UE 142, 144, 146, 148, 150, 152, 162. In general, the EPC and the E-UTRAN are referred to collectively as the LTE system.

The E-UTRAN 134 elements, EPC 108 elements, PTT call controller 102, and UEs 142 to 162 implement protocols and signalling in compliance with 3GPP TSs. The terms LTE communication system, LTE system, and Evolved Packet System (EPS) are used interchangeably herein, and are each defined as being inclusive of the E-UTRAN 134 and the EPC 108 but not inclusive of the PTT call controller 102 or the UE. Moreover, only a limited number of EPC elements and UEs, and one PTT call controller and E-UTRAN are shown in the diagram. More such elements may be included in an actual system implementation. Also, the E-UTRAN can be any type of access network, including any 3G, e.g., UMTS, or 4G e.g. WiMAX, access network, or WiFi.

In general, the UE, the PTT call controller 102, the EPC 108 logical elements, and the E-UTRAN 134 elements are each implemented using (although not shown) a memory, one or more network interfaces, and a processing device that are operatively coupled, and which when programmed form the means for these system elements to implement their desired functionality, for example as illustrated by reference to the methods and diagrams shown in FIGS. 2-12. The network interfaces are used for passing signalling, also referred to herein as messaging between the elements of the system 100. The signalling may include e.g., messages, packets, datagrams, frames, superframes, and the like. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the UE, the PTT call controller 102, the EPC 108 logical elements, and the E-UTRAN 134 elements may be programmed with software or firmware logic or code for performing functionality described by reference to FIGS. 2 to 12. In addition or alternatively, the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

The UE 142, 144, 146, 148, 150, 152, 162, are also referred to in the art as subscribers, communication devices, access devices, access terminals, mobile stations, mobile subscriber units, mobile devices, user devices, and the like. Although illustratively shown in FIG. 1 as a device used in a vehicle, the UE can be any type of communication device such as radios, mobile phones, mobile data terminals, Personal Digital Assistants (PDAs), laptops, two-way radios, cell phones, and any other device capable of operating in a wired or wireless environment and that can be used by a user in the system.

Infrastructure device 102 is an intermediary device that facilitates transport of media (e.g., voice, data, video, etc.) from one or more source applications to one or more destination devices (such as members affiliated with a communication group, such as a talkgroup) over the LTE system. As such, the application server may be, for instance, a computer aided dispatch (CAD) server, a media server, a call controller, etc. In one illustrative embodiment, infrastructure device 102 is an application server in a packet data network providing application layer services to UEs connected to the E-UTRAN 134 that are authorized and have the capabilities to use these services. In this instance, infrastructure device 102 is a PTT call controller providing PIT services to the UE. Other services may include, for example, PTV (Push-to-Video) services, PTX (Push-to-anything) services, etc.

In general in a communications system such as that shown in FIG. 1, two MBSFN areas can be independent, i.e. they would not have any common cells between them. However, two adjacent MBSFN areas can overlap, in which case they would have one or more common cells. With overlapping MBSFN areas, at least one cell is able to transmit one or more e-MBMS bearers assigned to one of the MBSFN areas, but can also transmit one or more e-MBMS bearers assigned to the other MBSFN area.

Figure 2:
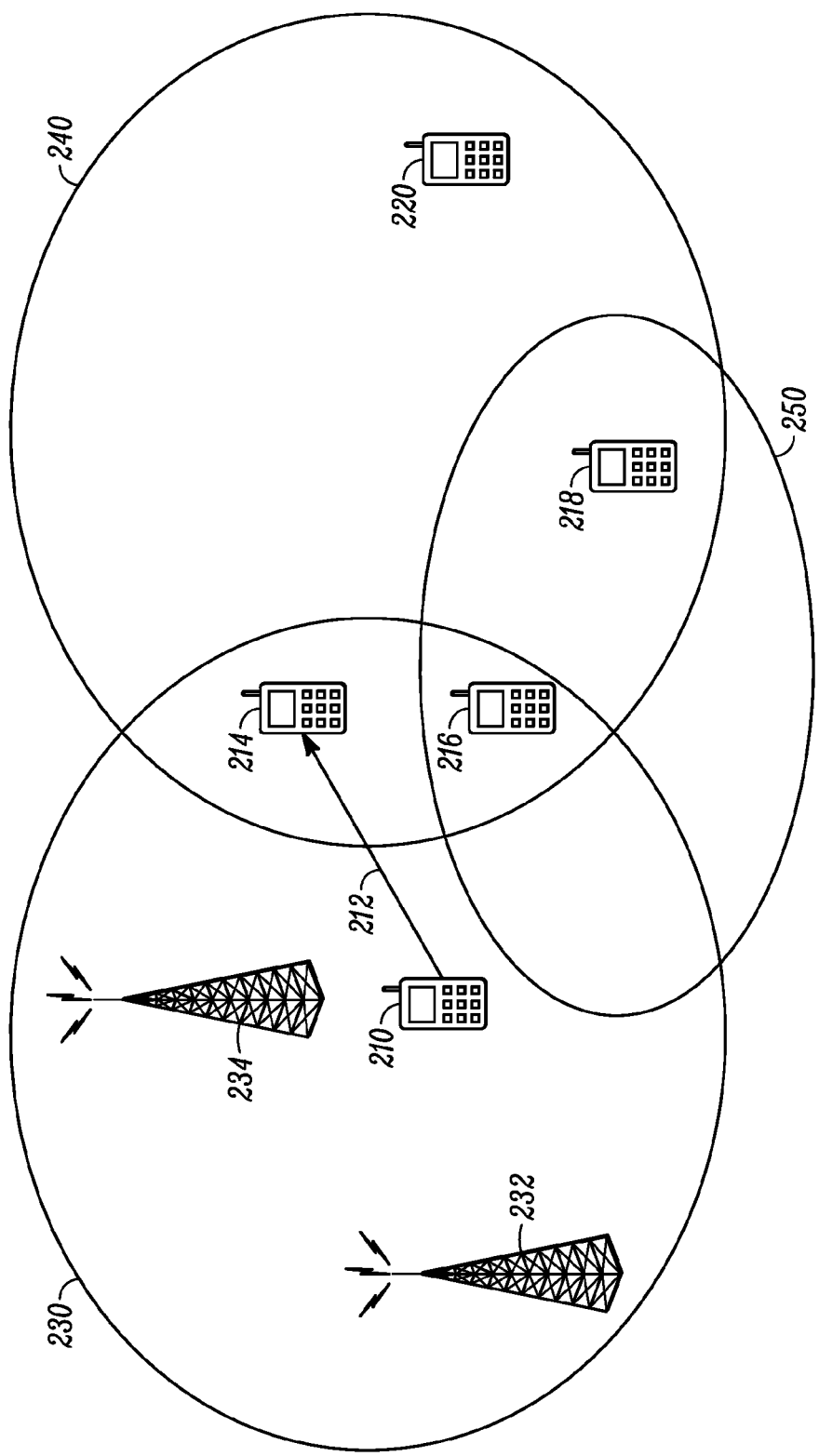
FIG. 2 is a schematic view of three MBSFN areas.

FIG. 2 is a schematic view of three MBSFN areas of a communications system. A UE is shown as UE 210, 214, 216, 218 and 220, each illustration of the UE corresponding to a successively later location of the UE. Arrow 212 illustrates motion between the locations shown as UE 210 and UE 212. Generally the UE is a 3GPP device, such as an LTE device. The UE may however be any of the examples of a UE explained with reference to FIG. 1, and may even be a half-duplex two-way radio mounted in a vehicle. Three MBSFN areas are shown respectively as MBSFN area 230, MBSFN area 240 and MBSFN area 250. Each MBSFN area includes multiple cells, which are not shown on FIG. 2 but can be understood from FIG. 1. Base stations 232 and 234 are shown within MBSFN area 230, and generally indicate the locations of two cells. There would normally be many more base stations in each of MBSFN area 230, MBSFN area 240 and MBSFN area 250. Each of MBSFN area 230, MBSFN area 240 and MBSFN area 250 has an overlap with the other two areas. This leads to the situation shown at the location UE 214, where all three of MBSFN area 230, MBSFN area 240 and MBSFN area 250 overlap. An 'overlap' may simply be an overlap in coverage. In this case, a UE at location UE 214, UE 216 or UE 218 may receive different E-MBMS bearers directly from two or more different cells, each cell being in a different one of MBSFN area 230, MBSFN area 240 and MBSFN area 250. However, the overlap may include an overlap at a cell level. In this case, UE 214, UE 216 or UE 218 may receive different E-MBMS bearers from one cell, which is part of two or more of MBSFN area 230. MBSFN area 240 and MBSFN area 250a.

Within any one MBSFN area shown in FIG. 2, the cells may deliver an MBSFN transmission. An MBSFN transmission provides simultaneous bit-for-bit identical signals in time and frequency in each cell of the MBSFN area. If a call group, of which the UE is part, is spread throughout more than two MBSFN areas, the media content of the call provided as an MBSFN transmission in one of those MBSFN areas will normally, in known systems, not be synchronous with the MBSFN transmission in another of the MBSFN areas in which members of the group are located.

Whilst in each MBSFN area, the UE will receive a corresponding MBSFN area identifier (MBSFN area ID), as explained with reference to FIG. 1. At each location of the UE shown in FIG. 2, the UE can report the corresponding identifier of the MBSFN area to an infrastructure device. The UE may report the MBSFN-Area ID parameter broadcast in the Session Information Block 13 (SIB-13) data block, but the UE may instead report the identifier of the MBSFN area in another form. The infrastructure device may be a PIT server, which may for example form part of PTT call controller 102 of FIG. 1. At the locations illustrated by UE 214, 216 and 218, the UE will receive more than one MBSFN area ID, and may report all or some of those MBSFN area IDs to the infrastructure device.

When the UE can receive from two MBSFN areas satisfactorily at one location, it may report one MBSFN area ID as being its primary preferred MBSFN area, and another MBSFN area ID as being its secondary preferred MBSFN area. When the UE can receive from three or more MBSFN areas at one location, it may also report one MBSFN area ID as being its ternary preferred MBSFN area ID, or multiple MBSFN area IDs as secondary preferred MBSFN area IDs.

The UE may also report an attribute parameter. The attribute parameter may indicate that the UE requires a Make Before Break (MBB) service. The UE may, for example, transmit this attribute parameter when it expects to move to another MBSFN area, or is already moving. The attribute parameter may instead or in addition comprise a request for a boost to coverage. Such a boost for coverage may be requested, for example, when the UE is at the periphery of an MBSFN area, or physical constraints around the location of the UE prevent strong signal reception.

The communications system of FIG. 2 may enable service continuity during mobility between MBSFN areas, i.e. across E-MBMS 'mobility events'. This enables MBB E-MBMS mobility, and may improve media reception, using time diversity reception by a UE of the same E-MBMS bearer from two different MBSFN areas. MBB E-MBMS mobility is thus achieved by the same E-MBMS bearer being received by the UE with a time offset from two or three of MBSFN area 230, MBSFN area 240 and MBSFN area 250. This timing offset allows the UE to receive the E-MBMS bearers simultaneously. Each of MBSFN area 230, MBSFN area 240 and MBSFN area 250 may be constrained to transmit on a subset of the subframes that differs from those used by the other two MBSFN areas, and from any other neighboring MBSFN areas not shown on FIG. 2. Such a constraint is illustrated later by FIG. 12.

In addition to UE 410 receiving the same E-MBMS bearer with a time offset from two or three of MBSFN area 230, MBSFN area 240 and MBSFN area 250, there may also be a frequency offset between the E-MBMS bearer. This is also illustrated later in detail in FIG. 12. However, each E-MBMS bearer will be transmitted with a Temporary Mobile Group Identifier (TMGI). The TMGIs used for the same bearer may be offset in both time and frequency, if different transmission subframes are used by the two or three MBSFN areas.

Enhancements at the application layer may thus be used to enable E-MBMS service continuity across MBSFN area boundaries, either for idle or connected UEs. These enhancements enable make-before-break E-MBMS mobility and may additionally provide opportunities for improved E-MBMS edge performance (i.e. media reception). For example, with communication services such as PTT, the UE may be permitted to continue receiving the same PTT audio in a neighboring MBSFN service area, as an MBB opportunity.

The table of FIG. 3 illustrates values that may be reported by the UE in the three MBSFN areas of the communication system of FIG. 2. The left column of the table uses the locations of the UE that are shown as UE 210, 214, 216, 218 and 220 in FIG. 2. The second column provides an example of details of the situation/status of the UE. The third column indicates the MBSFN area IDs that the UE can report at each location. The fourth column provides an example of preferences that the UE may report. The fifth column provides examples of one or more attribute parameters indicating preferences/status, which the UE may include in its report.

In FIG. 3, UE 210 receives only MBSFN area 230, and this is its default primary preferred MBSFN Area. Likewise, UE 220 receives only MBSFN area 240, and this is its default primary preferred MBSFN Area.

UE 214 receives both of MBSFN areas 230 and 240, and reports MBSFN area 230 as the primary preferred MBSFN area and MBSFN area 240 as the secondary preferred MBSFN area. UE 216 receives all of MBSFN areas 230, 240 and 250. UE 216 reports MBSFN area 230 as the primary preferred MBSFN area, MBSFN area 240 as the secondary preferred MBSFN area, and MBSFN area 250 as the ternary preferred MBSFN area. However, UE 218 receives MBSFN areas 240 and 250, but only reports MBSFN area 240. This is because MBSFN area 240 is received with sufficient signal strength that UE 218 only needs to report one MBSFN area ID.

Considering further the case of a UE that receives two or more MBSFN area IDs, there are various considerations that can be applied when determining which MBSFN area IDs the device reports. The UE may report all the MBSFN Area IDs along with preferences, and where appropriate, attribute preferences that may indicate a purpose or status. However, the UE may only report a single MBSFN if within good/strong E-MBMS coverage (primary MBSFN), as was the case of UE 218 in FIG. 2. The received E-MBMS signal strength can be determined by the quality of received E-MBMS channel, in terms of successful packet reception. Alternatively, the UE may report all MBSFN areas that meet a minimum threshold and identify the primary/preferred MBSFN area. This primary/preferred selection may be based upon E-MBMS signal strength, whether the UE is in idle or connected mode, current MBSFN area, preferred MBSFN area (for the UE or per group), whether the UE is mobile or stationary, or the location of the UE within the MBSFN area (middle or edge). Where additional MBSFN areas are reported, their selection as secondary and ternary may be based upon the same set of criteria.

Once the UE has determined which MBSFN Area IDs to report as primary preferred, secondary preferred and possibly ternary preferred, then the UE sends a message with the identifiers. The message may be a SIP PUBLISH message, and may provide an MBSFN-Area update. The UE may include an MBB service request parameter and/or boost (Diversity Receive) parameter in the MBSFN-Area update, in order to identify one or more reasons for reporting multiple MBSFNs. The reporting of visible MBSFN areas and additional attribute parameters can be done separately. For example, MBSFN area 230 may first be reported as the primary preferred MBSFN area, and MBSFN area 240 as secondary. Later, with a subsequent message, the UE may then transmit a request for a coverage boost.

Figure 4:
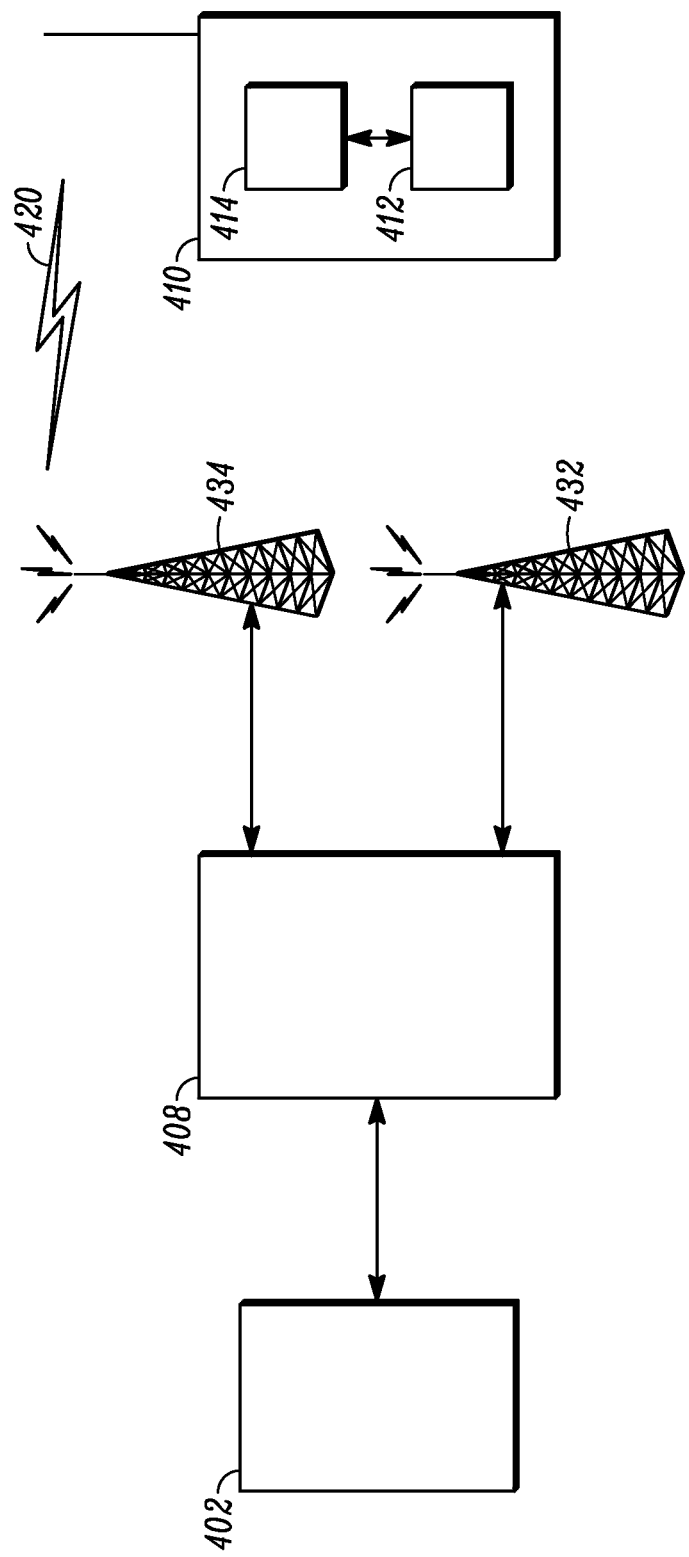
FIG. 4 is a block diagram illustrating elements of the infrastructure of the communication system and the UE.

FIG. 4 is a block diagram that illustrates the elements of the infrastructure of the communication system and the UE that may interact. Infrastructure device 402 may correspond to call controller 102 of FIG. 1. Packet core 408 may correspond to LTE EPC packet core 108 of FIG. 1. UE 410 may correspond to the UE of FIG. 2. UE 410 comprises transmission/reception circuitry 414, which is under the control of controller 412. Controller 412 comprises application logic. Base stations 432 and 434 may correspond to base stations 232 and 234 of MBSFN Area 230 in FIG. 2.

Radio link 420 between UE 410 and, for example, base station 434 allows the exchange of information between UE 410 and base station 434, and hence between UE 410 and infrastructure device 402. Radio link 420 allows UE 410 to report such information as that shown in the third, fourth and fifth columns of the table of FIG. 3 to infrastructure device 402. Radio link 434 also allows an E-MBMS transmission to UE 410 and other UEs of the call group of which UE 410 is part, within the MBSFN Area served by base stations 432 and 434. Radio link 420 is one link that must be traversed in order for a UE to communicate with the controller. However, an EPS Bearer is made up of a radio bearer and an EPC bearer, which together provide a communication path from a UE 410 to the packet core 408.

Application layer logic within UE 410 and infrastructure device 402 work together. As explained in more detail in connection with FIGS. 5 and 6, information provided by UE 410 allows infrastructure device 402 to deliver the same media content within multiple overlapping MBSFN areas simultaneously. This ensures that a UE such as UEs 214 or 216 in FIG. 2 can receive a group call from more than one overlapping MBSFN area. Here 'multiple overlapping MBSFN areas' need to be overlapping from a coverage perspective. However, the overlap does not necessarily need to include an overlap at a cell level, i.e. a cell which transmits E-MBMS bearers from two or more of the 'multiple overlapping MBSFN areas'.

The UE may then use application layer time-diversity reception to process the received E-MBMS media content, the UE receiving the same E-MBMS media content via each of the at least two E-MBMS bearers, with a time offset between the E-MBMS transmissions on each of the first and second E-MBMS bearers of the overlapping MBSFNs. The UE may use Real-time Transport Protocol (RTP) header information to construct a single media stream, from received E-MBMS media content.

The application layer logic within infrastructure device 402 uses the primary preferred MBSFN area and secondary preferred MBSFN area reported by at least one UE of a group, when selecting in which MBSFN areas the content should be provided (using an E-MBMS bearer within in each of the selected MBSFN areas). Where a UE reports attributes, the infrastructure device 402 may also use these attributes when making the selection of which of the MBSFN areas should be included in the group call and assignment of E-MBMS bearers in the selected MBSFN areas to carry the media content. Here, the 'media content' may be any or all of the voice, data, video, etc. content described in connection with element 102 of FIG. 1. The application layer logic within infrastructure device 402 uses at least one E-MBMS bearer within each selected MBSFN area, but may select more. The E-MBMS bearers may be pre-established E-MBMS bearers and assigned to the call. Alternatively, a new E-MBMS bearer may be created "on demand", and may use a different TMGI. So the E-MBMS bearers could have already been established and are now used for the call, or a new E-MBMS bearer needs to be created and used for the call. Where a new E-MBMS bearer is created, this may involve possibly extending the E-MBMS user service from the other MBSFN areas.

Extending the current E-MBMS service into the new MBSFN Area be establishing a new E-MBMS bearer and using the same TMGIs used in other MBSFN area Depending on the preferred MBSFN areas reported by each UE of a call group, a given UE may or may not be served by an E-MBMS bearer in each of its primary preferred MBSFN and secondary preferred MBSFN areas. Other constraints, such as system loading and the locations of other UEs in the call group, may also be used by the infrastructure device 402 when selecting which of the MBSFNs should carry the content. FIGS. 5 and 6 explain this in more detail. Additional MBSFN areas may be used, which would not have been included by known communication systems that base MBSFN area selection solely on one preferred MBSFN area known for each UE.

A UE that reports multiple identifiers of MBSFN Areas may detect the one or more MBSFN areas from MBSFN Area IDs in Session Information Block 13 (SIB-13) signaling provided by each MBSFN. The preferred MBSFN areas need to be identified, and providing the MBSFN-Area IDs from SIB 13 are one way of achieving this. Alternatively, the detection may be via application layer signaling, if needed. The UE reports the detected MBSFN coverage areas to infrastructure device 402 via, for example, an application server, along with preferences and purpose-attributes added by the UE. The attribute parameters may take many forms, for example indicating that the device is 'stationary' or 'mobile', 'MBB' or 'Boost' required.

Considering again the interaction between the infrastructure device 402 and the application layer logic within UE 410, the infrastructure device 402 may receive one or more MBSFNs area identifiers from many UEs. Infrastructure device 402 stores all received MBSFNs area identifiers. Within the communication system, policy rules may be set that determine whether a given UE is allowed to report multiple MBSFN-Area IDs. Different UEs may report MBSFNs area identifiers, preferences and attribute parameters at different times, so infrastructure device 402 may be arranged to hold a current list of received values of all those variables for each UE.

During call processing, infrastructure device 402 may follow a variety of additional steps, when determining which MBSFN areas to include in a call. That decision is based on the MBSFN area preference information (primary, secondary, ternary) supplied by UEs that are members of the group, and may also be based on at least one of group member MBB mobility or coverage boost requests; current system loading and whether secondary/ternary MBSFNs are already in the call; and call state (emergency, major incident, priority). Infrastructure device 402 acts as a controller, allocating resources based on the above parameters.

As explained previously, resource allocation by infrastructure device 402 will lead to secondary/ternary MBSFN areas being assigned in support of MBB/Boost requests from UEs. Although a UE might be assigned E-MBMS bearers in each of its primary and secondary preferred MBSFN areas, this may not be the case. A UE might be assigned E-MBMS bearers in its primary and ternary preferred MBSFN areas only. Such an assignment might arise when the UE's ternary preferred MBSFN area has also been identified as a secondary preferred or ternary preferred MBSFN area by one or more other UEs that are group members. A UE might also only be assigned E-MBMS bearers in its primary and ternary preferred MBSFN areas, if the UE's secondary preferred MBSFN area does not have capacity, for example has no available E-MBMS resources. Alternatively, a UE might only be assigned E-MBMS bearers in its primary and one of several secondary preferred MBSFN areas that it reported. In another possibility, the UE may not even be assigned the primary preferred MBSFN area that it reported. This might happen if the primary preferred MBSFN area did not have sufficient resources. Instead, the UE may be assigned its secondary preferred and ternary preferred MBSFN areas, or two of two or more secondary preferred MBSFN areas that it reported.

Thus far, resource allocation by infrastructure device 402 has been discussed in terms of E-MBMS bearers. However, the UE may in fact also be allocated a second Multicast Traffic Channel (MTCH) within one MBSFN, in order to provide boost coverage at the edge of the MBSFN area, when coverage of that MBSFN area does not overlap with any other MBSFN areas at the point where the UE is located. Multiple MTCHs may also be allocated if the call is an emergency call.

After allocation of two or more E-MBMS bearers by infrastructure device 402 for distribution of media content to the call group consisting of at least UE 410 of FIG. 4, UE 410 will receive the same information content from multiple MBSFNs, offset in time. Here, at least one E-MBMS bearer may be a secondary E-MBMS bearer for delivery of media content based on UE 410 preferences and attributes. Upon receiving the content, UE 410 will time align the multiple received content streams from the multiple E-MBMS bearers, for example by buffering the content. UE 410 will use header information to detect missing packets, and then combine packets from the multiple E-MBMS bearers to construct a single content stream. Each received E-MBMS bearer contains a copy of the same information for delivery to UE 410. However, the bits of each media stream actually received by UE 410 from two or more E-MBMS bearers will differ, due at least to such differences as different modulation and coding schemes being used by the codecs that encode the information prior to transmission on the E-MBMS bearers. A further reason why the two or more bit streams received by UE 410 will not be bit-for-bit identical is that parts of the signal may not be received satisfactorily, which is a problem that the UE 410 may partly be able to address by having a choice of received bit streams from the two or more E-MBMS bearers and applying time diversity reception. If a packet is missing in one received media content stream, UE 410 may be able to use the equivalent packet from another received media content stream. UE 410 may report to infrastructure device 402 if/when MBB service or a boost is no longer needed. This might occur when the UE moves to a point where signal reception from one MBSFN area is very good. One example of when this might occur would be when the UE moves from the location shown as UE 216 to either of the locations shown by UE 218 or UE 220 in FIG. 2. UE 410 may make an additional report when an MBSFN area is no longer visible. A further example of an additional report would be when there is a change of status of an MBSFN area, from a secondary or ternary preferred MBSFN area to a primary preferred MBSFN area for UE 410, and vice-versa.

The table of FIG. 5 illustrates one example of a call group having five members. The members of the call group only report preferences for MBSFN areas for which they have received an MBSFN Area ID. In this example, the UEs do not report any attribute parameters. The members of the group are UEs UE A, UE B, UE C, UE D and UE E. The four columns headed MBSFN Area 1 to MBSFN Area 4 in the table of FIG. 5 show what preferences each of UEs A to E have reported about the MBSFN Area.

The lowest row in the table of FIG. 5 shows the current capacity constraints known to infrastructure device 402. These capacity constraints are used by infrastructure device 402 in allocating E-MBMS bearers, in the example illustrated in FIG. 5.

The following illustrative example shows possible allocation decisions that infrastructure device 402 may make, on receiving the preferences shown in columns 3-6 of FIG. 5: (i) An E-MBMS Bearer is used in MBSFN Area 1 when a call starts for the Group because all group members (UEs A, B, C, D, and E) have reported MBSFN Area 1 as their primary MBSFN Area. (ii) An E-MBMS Bearer is also used in MBSFN Area 2, because multiple group members (UEs A and C) have reported MBSFN Area 2 as a secondary MBSFN Area, and capacity is available. This allocation is in accordance with an exemplary policy that an MBSFN Area needs to be reported by at least two group members, in order to justify using an E-MBMS Bearer. (iii) An E-MBMS Bearer is not used in MBSFN Area 3, because MBSFN Area 3 does not currently have E-MBMS resources to support an additional E-MBMS Bearer. (iv) An E-MBMS Bearer is not used in MBSFN Area 4, because not enough group members (just UE D) have reported MBSFN Area 4 as a secondary MBSFN Area. Here the term 'used' may mean the use of an existing bearer, or the allocation and starting of a new bearer.

The table of FIG. 6 illustrates another example of a call group, which this time has six members. The members of the group are UEs UE A, UE B, UE C, UE D, UE E, and UE F. The four columns headed MBSFN Area 1 to MBSFN Area 4 in the table of FIG. 6 also show what preference each of UEs A to F have reported about the MBSFN Area. However, the members UE A to UE F of the call group shown in the table of FIG. 6 can report preferences for MBSFN Areas for which they have received an MBSFN Area ID, and attribute parameters. The columns headed 'MBB' and 'Boost' at the right of the table of FIG. 6 show the attributes reported by each UE. UEs A to F may detect either MBSFN MBB opportunities, or poor coverage. When sending a service area location update to infrastructure device 402, the relevant UE may choose to include a MBB service request or Boost request for infrastructure device 402 to consider during call processing and E-MBMS bearer resource assignment.

The following illustrative example shows possible allocation decisions that infrastructure device 402 may make, on receiving the preferences shown in columns 3-6 of FIG. 6: i) An E-MBMS Bearer is used in MBSFN Area 1 when a call starts for the Group because group members (UEs A, B, C, D, E and F) have reported this as their primary MBSFN Area. (ii) An E-MBMS Bearer is not used in MBSFN Area 2 because even though multiple group members (UEs A and C) have reported it as a secondary MBSFN Area and E-MBMS resources are available, a threshold policy requires at least two secondary PLUS a request for improved signal (boost) or MBB. (iii) An E-MBMS Bearer is not used in MBSFN Area 3 because the MBSFN Area does not currently have capacity to support an E-MBMS Bearer even though there is a boost request. (iv) An E-MBMS Bearer is used in MBSFN Area 4 because there are 2 devices listed as secondary and one has requested MBB. For example: Call control can verify from previous service area location updates that UE D previously reported only MBSFN Area 1 (and its most recent service area location update reported MBSFN Area 4, MBSFN Area 1 and requested MBB). This indicates with high likelihood the device will handoff to MBSFN Area 4 and therefore MBSFN Area 4 is added to the call. Again, 'used' may mean the use of an existing bearer, or the allocation and starting of a new bearer.

The tables in FIGS. 5 and 6 may represent preferences reported prior to the start of a call. These preferences are then used by infrastructure device 402 to select MBSFN areas when a call starts. However, infrastructure device 402 may also add or remove MBSFN areas while a call is in progress. For example, a UE may detect poor reception in an MBSFN area during a call, and then request a boost. This might lead to a new MBSFN area being added, during a call. Similar scenarios apply if a UE is moving between MBSFN areas while a call is in progress. The UE may then request the MBB after the call started, but before the 'handover' needs to occur.

Many algorithms could be used for including an MBSFN Area in a call, with the threshold policy for an MBSFN area being programmable to any number suitable for the system. Each MBSFN Area could use different policies and/or different detailed criteria. As examples, an E-MBMS bearer may be assigned in a particular MBSFN Area: (i) When at least two UEs request the particular MBSFN Area as their primary preferred MBSFN Area, otherwise the call control algorithm may choose to unicast to the UEs, rather than use E-MBMS resources. (ii) When at least one UE requests the particular MBSFN Area as the primary preferred MBSFN Area, and at least two UEs request it as their secondary preferred MBSFN Area. (iii) When at least one UE requests the particular MBSFN Area as the primary preferred MBSFN Area, at least two UEs request the particular MBSFN Area as their secondary preferred MBSFN Area, and there is an attribute parameter from any of these three UEs, requesting an MBB service or boost. (iv) When at least two UEs request the particular MBSFN Area as their secondary preferred MBSFN Area, and there is an attribute parameter from either of these two UEs requesting an MBB service or boost. (v) When at least four UEs request the particular MBSFN Area as their secondary preferred MBSFN Area, and there is an attribute parameter from any of these UEs requesting an MBB service or boost.

As is clear from FIGS. 2-6, a UE that it is within coverage of two or more MBSFNs works together with an infrastructure device to implement a method of providing MBMS continuity within and between MBSFN coverage areas. When the UE is within coverage of multiple MBSFN areas, it may assign preferences to some or all of the multiple MBSFN areas and reports these to an application function performed by infrastructure device 402. The UE may also report the MBSFNs with associated attribute parameters. The UE then receives the same content on multiple time-diverse E-MBMS bearers. The attribute parameters may be purpose driven, for example specifying the need for a coverage boost, or for MBB handover. These attribute parameters may be dependent on factors such as the device being stationary or at an incident, incident locations, or an emergency state.

At the infrastructure device 402, a primary set of MBSFN areas and secondary set of MBSFN areas are determined, to include in media distribution for a call group. Primary MBSFN areas are determined based on all UE locations and their reported MBSFN Area preferences. Secondary MBSFN areas are based on a balance of factors. These factors may include call group member reported MBSFN Area preferences, purpose-based attribute parameter preferences, if available, and availability of E-MBMS communication resources.

As is also clear from FIGS. 2-6, the allocation by infrastructure device 402 of E-MBMS resources for E-MBMS media content delivery, acting as a controller, takes into account information provided by the UE about reported MBSFN Areas and MBSFN Area preferences and attributes. Where a UE supplies attribute parameters relating to mobility and/or coverage attributes, and thus its needs for an MBB service or a boost, the allocation by infrastructure device 402 of resources for E-MBMS transmission also takes these into account. However, the allocation of resources for E-MBMS transmission by infrastructure device 402 may also take into account needs for user-driven continuity of service across MBSFN areas, and/or the location of other group members. Considering the location, an example might occur where there are UEs in MBSFN Areas 230 and 250 in FIG. 3, and infrastructure device 402 may allocate an E-MBMS bearer in MBSFN Area 240 'in between', especially if multiple users report MBSFN Area 240 as a secondary preferred MBSFN Area. The allocation of resources for E-MBMS transmission by infrastructure device 402 may also take into account characteristics of the call/bearer, for example whether or not the call is an emergency call. Infrastructure device 402 may, for example, always assign a bearer in MBSFN Area that is identified as a secondary MBSFN Area by any UE on a call, when that call is an emergency call. As is clear from the lowest row in the table of FIGS. 5 and 6, resource availability may also be a factor in the allocation decision. For example E-MBMS resources can be assigned as extra/secondary E-MBMS resources, if they are otherwise unused and are in a neighboring MBSFN area, or even the same MBSFN area.

Infrastructure device 402 may receive identifiers for primary preferred MBSFN areas and secondary preferred MBSFN areas for very large numbers of UEs that are members of a call group. Infrastructure device 402 then determines which E-MBMSMBSFN areas to include in the call on the basis of all the primary preferred MBSFN areas and secondary preferred MBSFN areas known to it for all the UEs. Infrastructure device 402 may assign a different Temporary Mobile Group Identifier (TMGI) for the E-MBMS bearers in each of the first and second MBSFN areas. Alternatively, infrastructure device 402 may assign the same TMGI for the E-MBMS bearers in each of the first and second MBSFN areas serving the UE. Two or more Multicast Traffic Channels will be assigned, one each to support each E-MBMS bearer. However, the MTCH is an LTE RAN specific identifier. Hence the MTCH is only known to the lower layers of LTE RAN elements, i.e. the MTCH is not known by the UE, or by the infrastructure device 402 acting as an application controller. The information that infrastructure device 402 and the UE have access to are MBSFN identities and TMGI identities. The TMGI will be mapped to a MTCH by RAN elements, as known from the 3GPP standards.

At the start of a group call, infrastructure device 402 notifies call group members within the one or more secondary MBSFNs of the secondary E-MBMS bearer allocated, i.e. the second E-MBMS bearer, where the E-MBMS bearer is identified by a TMGI. The UE may already be receiving the call on a first E-MBMS bearer used in its preferred MBSFN area, so may not need to be notified of the first E-MBMS. In addition, infrastructure device 402 may allocate a 'first' E-MBMS bearer in a first MBSFN area, a 'second' E-MBMS bearer in a second MBSFN area, and a 'third' E-MBMS bearer also within the first or second MBSFN. This allows UE 410 to receive the media content on two E-MBMS bearers in one MBSFN area, and an additional E-MBMS bearer in the other MBSFN area, each offset in time. With the time offset, UE 410 can employ application layer time-diversity reception to the media content from the three E-MBMS bearers. Three such bearers in two MBSFN areas may be assigned by default, whenever the priority level of the call indicates that the call is an emergency call.

Considering UE 410 further, it is clear that UE 410 provides E-MBMS service area location update information to infrastructure device 402 operably coupled to the communications system. The communications system may be a Third Generation Partnership Project (3GPP) compliant wireless communication system having a radio access network partitioned into a plurality of MBSFN areas, wherein each MBSFN area can provide a simulcast transmission, and supports a plurality of E-MBMS bearers for transporting media streams to UEs. UE 410 is configured for multiple MBSFN reception, and uses application layer processing to perform: (i) receiving transmissions from at least two MBSFN areas, each transmission comprising an MBSFN Area Identification (MBSFN Area ID) for a different MBSFN; (ii) choosing a primary preferred MBSFN area and at least one secondary preferred MBSFN area, and notifying infrastructure device 402 of the primary preferred MBSFN area and the at least one secondary preferred MBSFN area, and (iii) when the UE receives media content provided to a call group comprising the UE, the UE receives the media content on at least a first E-MBMS bearer transmitted in a first MBSFN area and a second E-MBMS bearer transmitted in a second MBSFN area, wherein the first and second E-MBMS bearers provide the same media content to the UE. The first MBSFN area may be the UE's primary preferred MBSFN area, and the second MBSFN area may be the UE's secondary preferred MBSFN area, although this is not always the case.

UE 410 may notify infrastructure device 402 about an attribute preference, the purpose attribute being selected in dependence on a current need of UE 410 for at least one of Make Before Break (MBB) service or a coverage boost. UE 410 may receive the media content on a different Temporary Mobile Group Identifiers (TMGI) than that used to identify the first E-MBMS bearer and the second E-MBMS bearer.

UE 410 may determine whether a level of a received signal from each of at least two MBSFN areas exceeds a first threshold and a second threshold, the second threshold being greater than the first threshold. The UE 410 may then only consider a received signal if it exceeds the first threshold. When none of the received signal exceeds the second threshold, UE 410 may choose a primary preferred MBSFN area, a secondary preferred MBSFN area and possibly a ternary preferred MBSFN area, and notify infrastructure device 402 about the primary preferred MBSFN area, secondary preferred MBSFN area and ternary preferred MBSFN area. However, if one of the received signals does exceed the second threshold, then UE 410 may report only the MBSFN Area exceeding this threshold, as was the case for UE 218 in FIG. 3.

UE 410 may report to an application server of the 3GPP compliant system when UE 410 no longer needs to receive more than one media stream, i.e. no longer needs to receive the same media stream over multiple E-MBMS bearers. This may serve to further free up E-MBMS resources.

Figure 7:
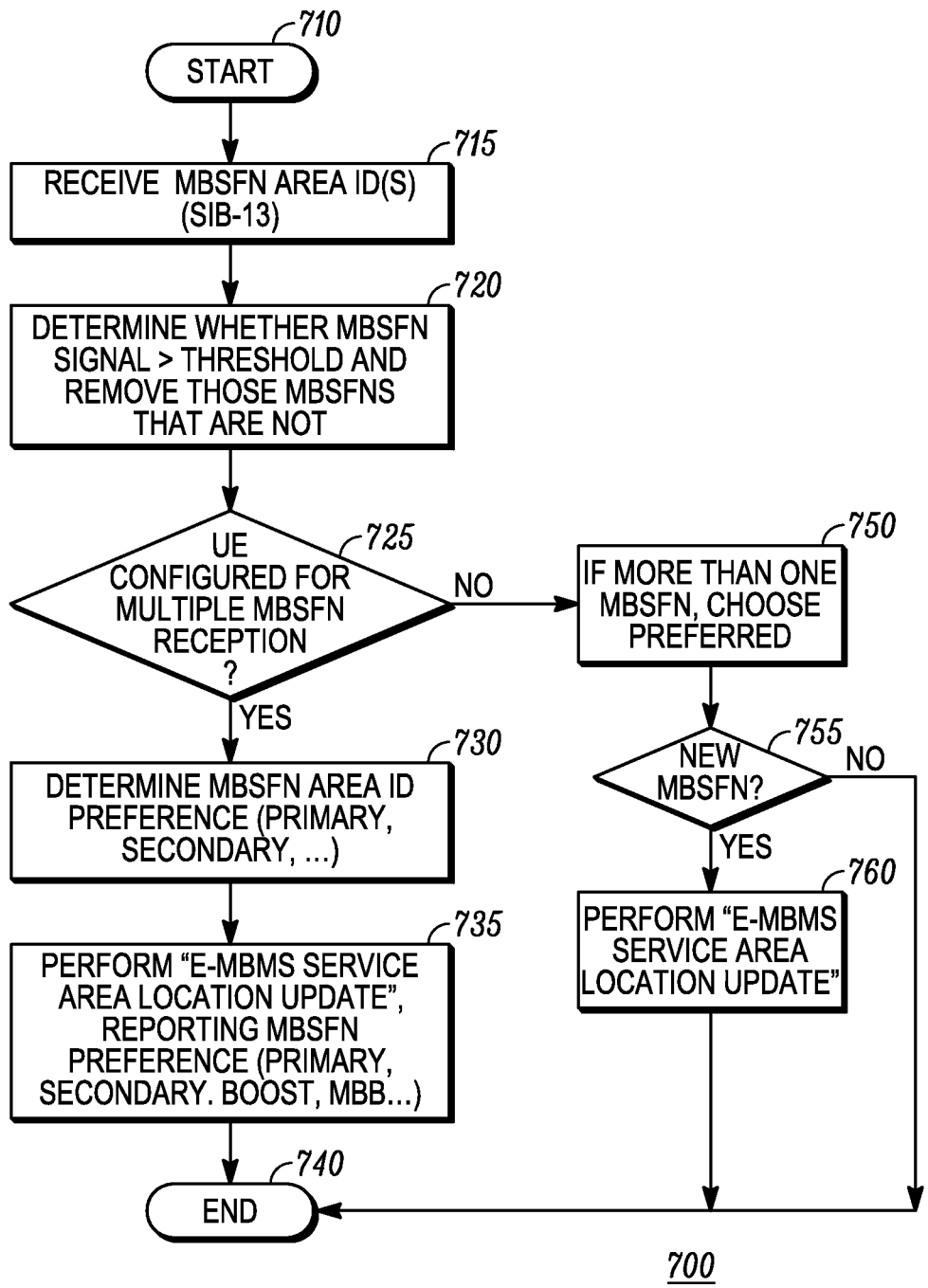
FIG. 7 is a flowchart of a method of providing a service area location update, by a UE, in accordance with some embodiments.

FIG. 7 is a flowchart of a method 700 of providing an MBSFN service area location update, by UE 410, in accordance with some embodiments.

Following start 710, UE 410 receives MBSFN area IDs at 715. At 720, UE 410 determines whether the quality of reception from each MBSFN area is above a first threshold. Those that are not are discarded. At 725, a decision is made whether or not the UE is in fact configured to receive traffic signals from more than one MBSFN area. If yes, then the method proceeds to 730. At 730, the UE 410 decides on relative preferences of the two or more received MBSFN area IDs. At 735, UE 410 reports the preferences as an 'E-MBMS service area location update', along with any attribute parameters such as MBB service request or a boost request. An attribute parameter such as a MBB service request in an 'E-MBMS service area location update' may act as a 'flag', to notify the purpose of reporting multiple MBSFN areas, if the purpose is known by the UE. For example a stationary device on the fringe of coverage may report multiple MBSFN areas for improved reception quality, as opposed to MBSFN mobility. This flag may be used, for example, to request that multiple MBSFN areas to be labeled as 'preferred' in the list held by infrastructure device 402. Then the method ends at 740.

If UE 410 is not configured to receive traffic signals from more than one MBSFN area, then at 725 the method proceeds to 750. If the quality of reception from more than one MBSFN area is above the first threshold, then UE 410 chooses the most preferred MBSFN area, at 750. At 755, a decision is made whether the chosen most preferred MBSFN area is new. If it is, then UE 410 reports the most preferred MBSFN area as an 'E-MBMS service area location update' at 760. Then the method ends at 740. At 755, if the chosen most preferred MBSFN is not new, then the method ends at 740.

Figure 8:
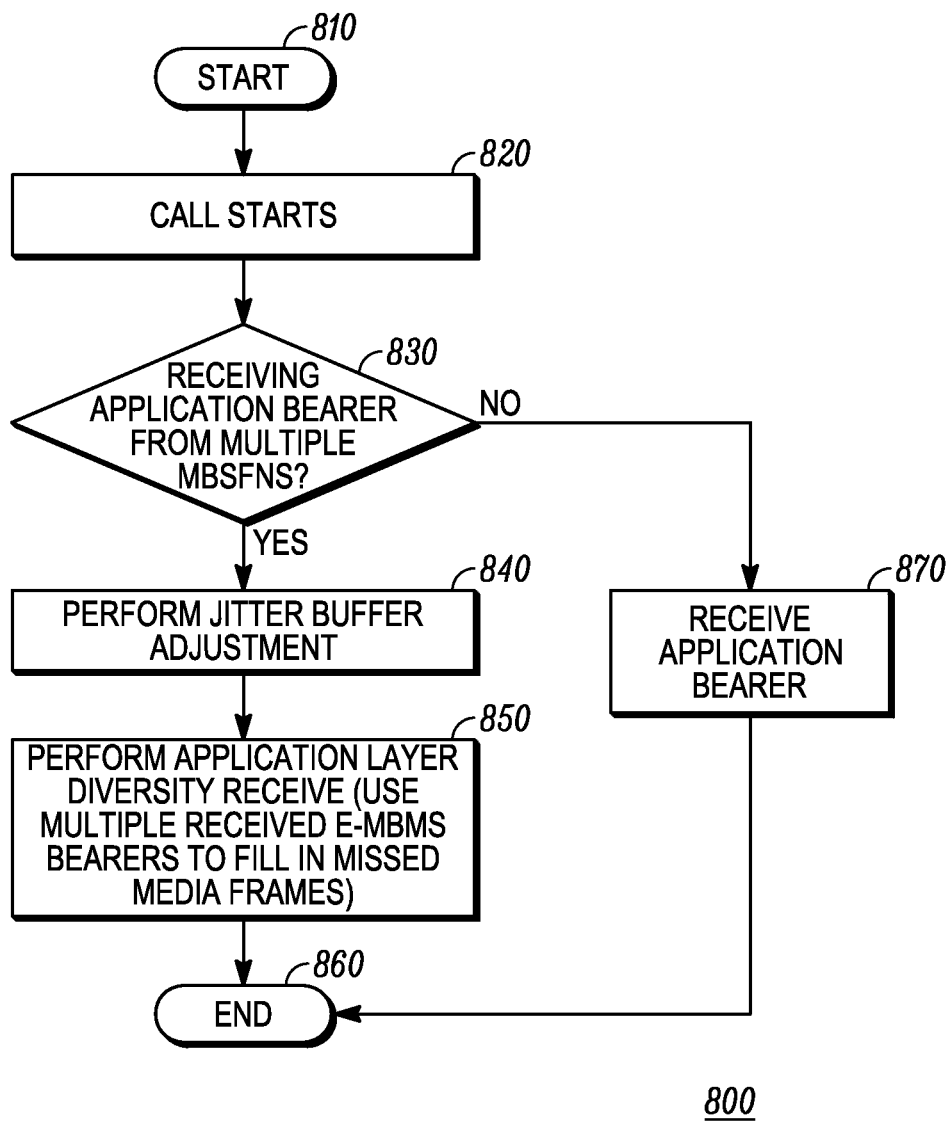
FIG. 8 is a flowchart of a method of receiving multiple E-MBMS bearers, by a UE, in accordance with some embodiments.

FIG. 8 is a flowchart of a method 800 of receiving multiple E-MBMS bearers, by a UE, in accordance with some embodiments.

Following the start at 810, a call begins at 820. If, at 830, UE 410 is receiving the same media content on E-MBMS bearers from more than one MBSFN area, then the method proceeds to perform jitter buffer adjustment at 840. At 850, UE 410 performs application layer diversity reception, by filling in missed media frames using the multiple received E-MBMS bearers. The method ends at 860.

If, at 830, UE 410 is receiving E-MBMS bearers from only one MBSFN area, then the method proceeds to 870. UE 410 receives on only one E-MBMS bearer, until the method ends at 860.

The method of FIG. 8 may describe the behavior of a UE 410 when the same media content is distributed across different MBSFN areas on different TMGIs. This may occur either for MBB service or diversity reception, i.e. coverage boost. The adjustment of the jitter buffer to accommodate the reception of diverse E-MBMS bearer timing differences may be achieved by reading those differences from Real-time Transport Protocol (RTP) header information of the received media packets. If an RTP frame of the media content stream is missing from the primary path, but was received on the secondary/ternary path within the jitter buffer time, then UE 410 will use the RTP frame received on the secondary/ternary path to reconstruct the received media stream. When the same packet is received multiple times, UE 410 will discard all but one. When a packet is missed in one stream, UE 410 will use the corresponding packet from the other stream. UE 410 may rely on RTP or other header information, at any time, to construct a single media stream from different received streams.

Figure 9:
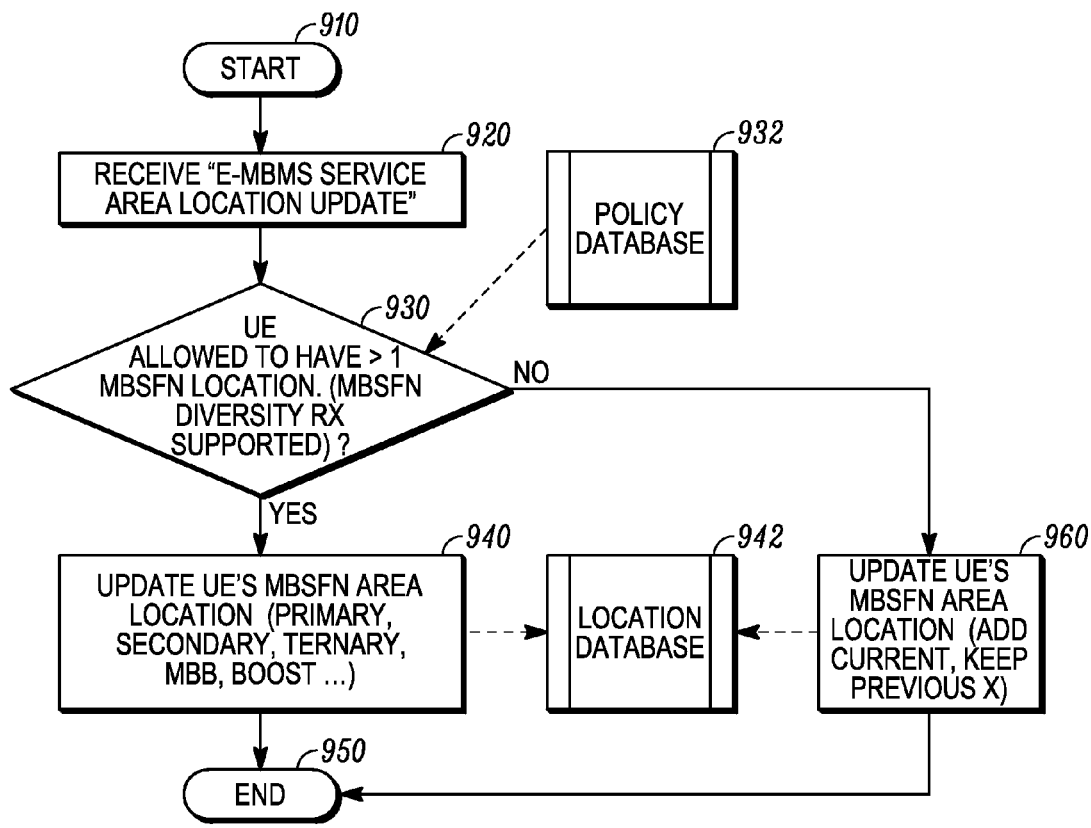
FIG. 9 is a flowchart of a method of receiving a service area location update, by an infrastructure device, in accordance with some embodiments.

FIG. 9 is a flowchart of a method 900 of receiving an E-MBMSMBSFN area location update, by an infrastructure device, in accordance with some embodiments.

Following the start at 910, at 920 the infrastructure device 402 receives an 'E-MBMS service area location update', which may be generated as illustrated in FIG. 7. At 930, policy database 932 is checked to see whether UE 410 reporting the 'E-MBMS service area location update' is allowed to receive media content from more than one MBSFN area. UE 410 may also be listed as able to support diversity reception from multiple MBSFN areas. If the UE is allowed to receive media content from more than one MBSFN area, then at 940 the UE's reported MBSFN area preferences and any attribute parameters are updated. A location database 942 may also be updated. At 950, the method ends.

If, at 930, the UE is not allowed to receive media content from more than one MBSFN area, then method 900 proceeds to 960. At 960, the UE's reported primary MBSFN area location is updated, and this update may be provided to location database 942. Location database 942 may store 'Reported Location', 'Preferences' and 'Attributes' of many UEs, and each of these may be updated. At 950, the method ends.

Figure 10:
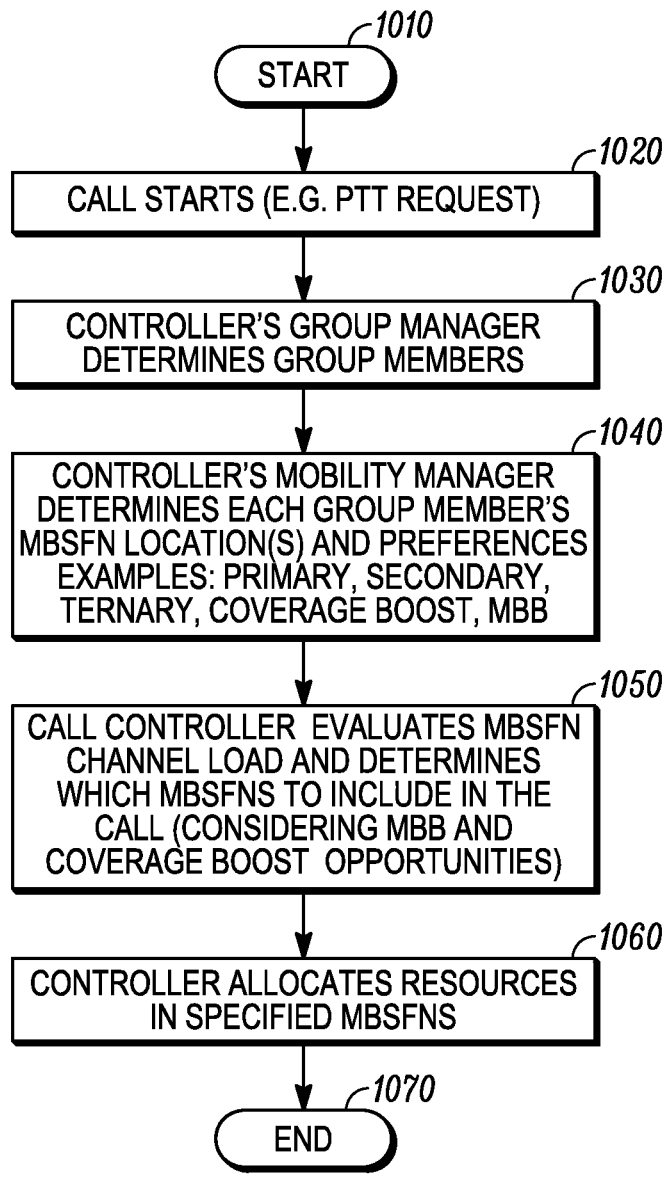
FIG. 10 is a flowchart of a method of assigning MBSFN areas and E-MBMS bearers by an infrastructure device, in accordance with some embodiments.

FIG. 10 is a flowchart of a method 1000 of assigning MBSFN areas and E-MBMS bearers by an infrastructure device, in accordance with some embodiments.

Following start 1010, a call begins at 1020. This may be due to a Push-To-Talk (PTT) request. Group membership is determined at 1030. At 1040, the location in an MBSFN area, the preferences and any attribute parameters are determined for each group member, i.e. each UE in that call group. At 1050, a decision is made about the MBSFN areas to include in the call. As part of 1050, secondary E-MBMS bearers are allocated, to distribute the same media content based on UE preferences and attributes. If a first UE in a particular MBSFN area is already receiving the media content, then a second UE in that MBSFN area 410 will receive the content on the same E-MBMS bearer as the first UE, so a new E-MBMS bearer is not assigned for the second UE.

At 1060, E-MBMS resources are allocated to the chosen MBSFN areas. Infrastructure device 402 may be configured to perform any of the roles identified at 1030, 1040, 1050 or 1060. At 1070, the method ends.

Considering FIGS. 9 and 10 together, it is apparent that several actions differ entirely from known methods. Firstly, policy is introduced to determine whether a given UE is allowed to register multiple MBSFN areas. During call processing in FIG. 10, additional steps are included to determine which MBSFN areas to include in a call. This determination is based on UE MBSFN area information (primary, secondary, ternary) and may include some or all of MBB or coverage boost opportunity, in addition to E-MBMS loading, and the number of interested UEs. So a UE reports multiple MBSFN areas, and may include a set of attribute parameters with that report or later in another report. Infrastructure device 402 makes the determination which MBSFN areas are included in a particular call. The additional parameters provided by the UE to the controller aid in tuning the MBSFN area selection algorithm for enhanced E-MBMS media content reception.

Known methods report MBSFN Area IDs for the purpose of tracking UEs to MBSFN areas. However, the steps 930, 940, 1040 and 1050 of FIGS. 9 and 10 enable (i) UE Identification of primary, secondary, ternary MBSFN areas and their utilization for MBB or application diversity receive (i.e. coverage boost). (ii) UE reception of the same media content from disparate MBSFN areas on differing TMGIs in each E-MBMS. The UE reception can be controlled by an infrastructure device 402 that acts as a controller, minimizing resource blocking while maximizing E-MBMS performance.

Figure 11:
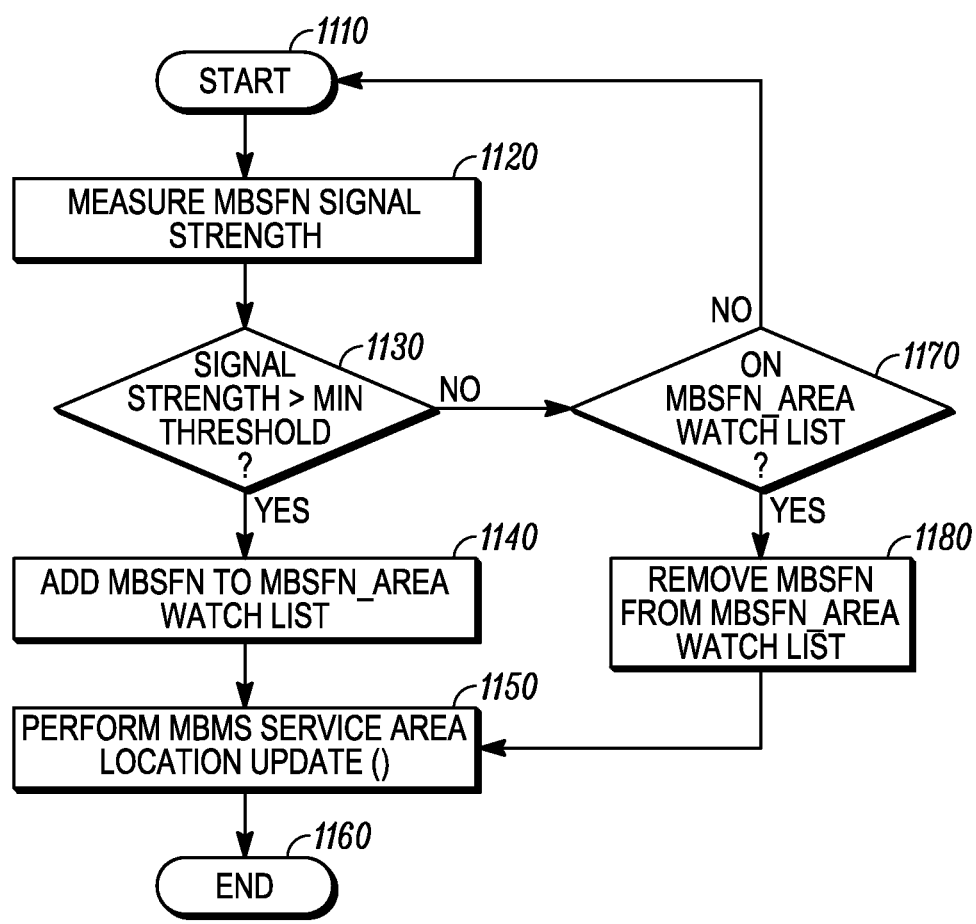
FIG. 11 is a flowchart of a method of deciding on MBSFN areas for inclusion in a service area location update, by a UE, in accordance with some embodiments.

FIG. 11 is a flowchart of a method of deciding on MBSFN areas for inclusion in an E-MBMS MBSFN service area location update, by a UE, in accordance with some embodiments.

Following start 1110, UE 410 measures the received MBSFN signal strength. For example, UE 410 may measure the media frame reception quality, MCCH signal metrics or MTCH signal metrics. If, at 1130, the signal strength exceeds a first threshold, the method proceeds to 1140. At 1140, the MBSFN area is added to an MBSFN area watch list of UE 410. At 1150, UE 410 performs an E-MBMS Service area location update, which may include an MBB request or an attribute parameter requesting a coverage boost. The method ends at 1160.

If, at 1130, the signal strength does not exceed a first threshold, the method proceeds to 1170. If, at 1170, the MBSFN area is already on the MBSFN area watch list of UE 410, the MBSFN area will be removed from the watch list at 1180. Then the method proceeds to 1150, where UE 410 performs an E-MBMS Service Area Location update. If, at 1170, the MBSFN area is not on the MBSFN area watch list of UE 410, the method returns to the start at 1110.

UE 410 may determine whether a level of a received signal from each of the received MBSFN areas, for example at least three MBSFNs, exceeds a first threshold and a second threshold. In this case, the second threshold is greater than the first threshold. UE 410 may then only consider a received signal if it exceeds the first threshold. When none of the at least three signals exceeds the second threshold, UE 410 may choose a primary preferred MBSFN area, a secondary preferred MBSFN area and a ternary preferred MBSFN area, and notify the infrastructure device 402 about the primary preferred MBSFN area, secondary preferred MBSFN area and ternary preferred MBSFN area. When at least one of the at least three signals exceeds the second threshold UE 410 may choose the highest of the signals as a default MBSFN area and then just notify the infrastructure device 402 about the default MBSFN area.

Figure 12:
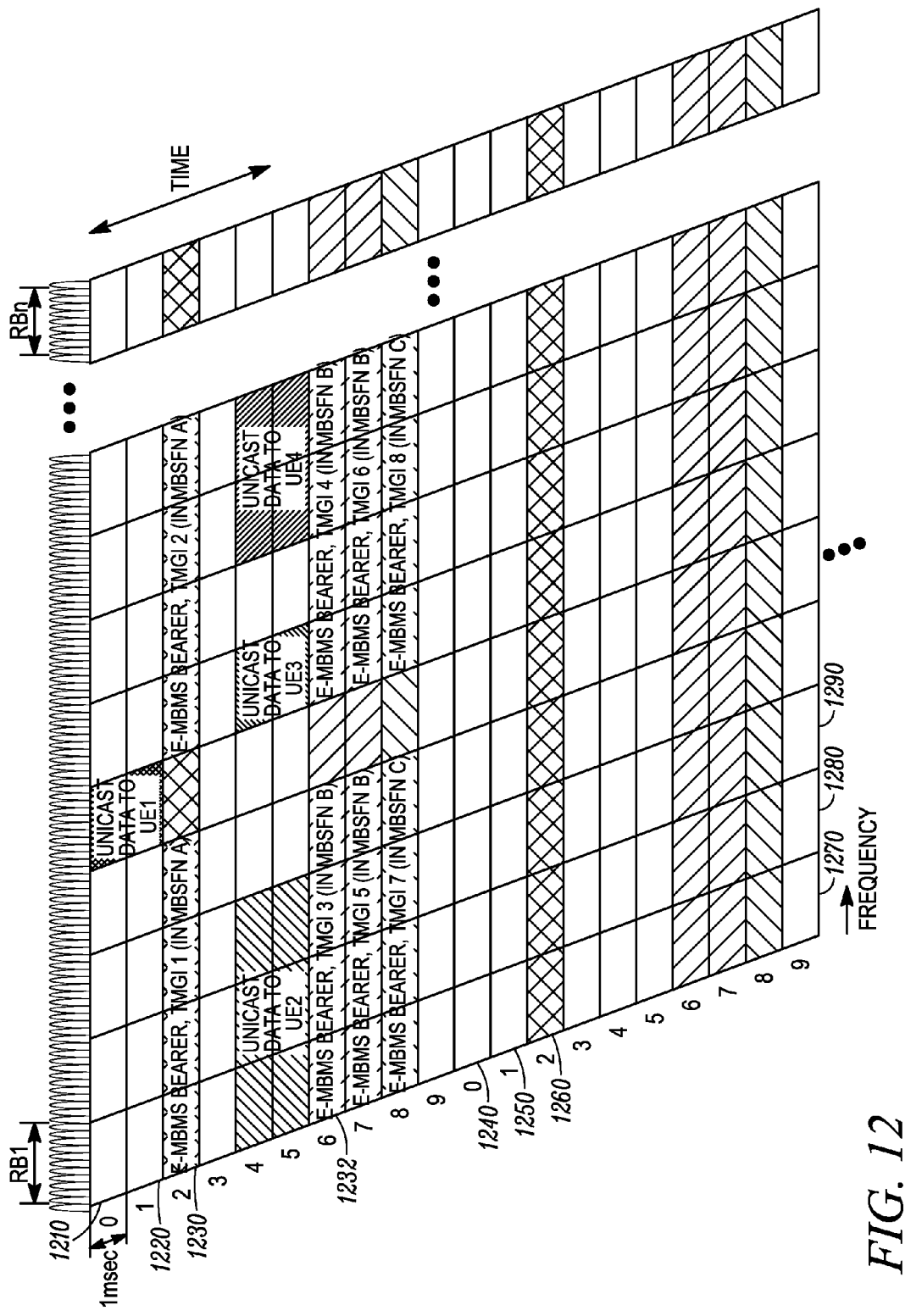
FIG. 12 is a schematic view of signals that may be transmitted in a communication system, in accordance with some embodiments.

FIG. 12 is a schematic view of signals that may be transmitted in a communication system, in accordance with some embodiments.

Each of rows 1210, 1220 and 1230 shows a 1 msec subframe. The first ten subframes shown on FIG. 12 are numbered 0-9, and these form a first radio frame. Each of rows 1240, 1250 and 1260 shows one of the first three a 1 msec subframes of a second radio frame, the ten subframes of which are also numbered from 0-9. The second radio frame is transmitted after the first radio frame.

In the embodiment of FIG. 12, the subframes numbered 0, 4, 5 and 9 of each frame are not available for E-MBMS transmissions. At least subframes 0, 4, 5 and 9 in each frame can be used for unicast transmissions to UEs, and may be reserved for this purpose. Unicast may be used to transmit to a UE that does not meet the requirements for assignment of a multicast service, for example because it is the only member of a call group currently identifying a particular MBSFN area as a preferred MBSFN area. However, unicast traffic can be assigned to any parts of a subframe not allocated to E-MBMS.

Columns 1270, 1280 and 1290 represent the first three resource blocks of each subframe. These blocks may be 180 KHz blocks, each comprising 12 subcarriers. Considering for example LTE, LTE can be deployed in multiple bandwidths. The bandwidth depends on the spectrum allocated by local governments, e.g. 1.25 MHz, 5 MHz, and 10 MHz. In the US, Public safety has been given 10 MHz uplink and downlink for a total of 20 MHz. FIG. 12 shows resource blocks running from RB1 to RBn. Using the scheme of FIG. 12 where 1 Resource Block=180 KHz and has 12 Subcarriers, would mean that 5 Mhz of bandwidth has 25 Resource blocks, and 10 MHz would have 50 Resource Blocks (RB).

In FIG. 12, time diversity is guaranteed in that neighboring MBSFNs are configured to transmit on a subset of the subframes, the subset for any MBSFN area being different from that of its neighbors. Thus, in the embodiment of FIG. 12, neighboring MBSFNs are not allowed to use the same subframe at the same time. When the controller uses E-MBMS bearers in neighboring MBSFNs, the E-MBMS bearers will use different subframes, this ensuring time diversity reception is possible. In addition to the time offset, there may also be a frequency offset. For example, when subframe 2 with reference 1230 and subframe 6 with reference 1232 are used by different MBSFN areas, then TMGI 1 and TMGI 4 are offset in time AND frequency. In contrast, TMGI 1 and TMGI 3 are only offset in time, since they are transmitted at different times but on the same resource blocks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of assigning Multimedia Broadcast Multicast Service (E-MBMS) bearers in at least two Multimedia Broadcast Single Frequency Network (MBSFN) areas in a Third Generation Partnership Project (3GPP) compliant wireless communication system, wherein the 3GPP compliant wireless communication system comprises a radio access network partitioned into a plurality of MBSFN areas, wherein each MBSFN area supports a plurality of E-MBMS bearers for transporting media streams to user equipments (UE), the method comprising:
receiving, at the application layer of an infrastructure device operably coupled to the 3GPP compliant wireless communication system, information from a UE, the information comprising an identifier that identifies a primary preferred MBSFN area that provides signals to the UE, and an identifier that identifies a secondary preferred MBSFN area that provides signals to the UE;
assigning, at the application layer of the infrastructure device, a first E-MBMS bearer in a first MBSFN area and a second E-MBMS bearer in a second MBSFN area, to support a call to the UE, the first and second E-MBMS bearers providing the same media content to the UE, wherein the first MBSFN area is one of the UE's primary preferred MBSFN area and secondary preferred MBSFN area and the second MBSFN area is the other of the UE's primary preferred MBSFN area and secondary preferred MBSFN area,
wherein the infrastructure device uses the information from the UE in the assignment and transmits the same media content to the UE on each of the first and second E-MBMS bearers.

2. The method of claim 1, further comprising the infrastructure device:
receiving an attribute parameter from the UE, the attribute parameter comprising a request for Make Before Break (MBB) service; and
assigning the first MBSFN area and the first E-MBMS bearer, and the second MBSFN area and the second E-MBMS bearer, also based on the attribute parameter.

3. The method of claim 1, further comprising the infrastructure device:
receiving an attribute parameter from the UE, the attribute parameter comprising a request for a boost to coverage; and
assigning the first MBSFN area and the first E-MBMS bearer, and the second MBSFN area and the second E-MBMS bearer, also based on the attribute parameter.

4. The method of claim 1, further comprising:
the first MBSFN area being the UE's primary preferred MBSFN area, and the second MBSFN area being the UE's secondary preferred MBSFN area.

5. The method of claim 1, further comprising:
the infrastructure device transmitting the same media content to the UE on each of the first and second E-MBMS bearers, with a time offset between the media content transmissions on each of the first and second E-MBMS bearers, whereby the UE can employ application layer time-diversity reception to received media content.

6. The method of claim 5, further comprising:
the infrastructure device transmitting the same media content to the UE on each of the first and second E-MBMS bearers, with a frequency offset between the time offset media content transmissions on each of the first and second E-MBMS bearers.

7. The method of claim 1, further comprising the infrastructure device:
receiving, from a second UE, an identifier of a primary preferred MBSFN area that provides signals to the second UE and an identifier of a secondary preferred MBSFN area that provides signals to the second UE;
determining which E-MBMS bearers and MBSFN areas to include in the call to a call group comprising the UE and the second UE, on the basis of:

the primary preferred MBSFN area that provides signals to the UE;
the secondary preferred MBSFN area that provides signals to the UE;
the primary preferred MBSFN area that provides signals to the second UE; and
the secondary preferred MBSFN area that provides signals to the second UE.

8. The method of claim 1, further comprising the infrastructure device:
assigning a different Temporary Mobile Group Identifier (TMGI) for the E-MBMS bearers in each of the first and second MBSFN areas.

9. The method of claim 1, further comprising the infrastructure device:
assigning the same Temporary Mobile Group Identifier (TMGI) for the E-MBMS bearers in each of the first and second MBSFN areas.

10. The method of claim 1, further comprising:
the infrastructure device assigning the first MBSFN area and the first E-MBMS bearer and the second MBSFN area and the second E-MBMS bearer also based on a current loading of MBSFN areas of the wireless communication system.

11. The method of claim 1, further comprising:
the infrastructure device, at the start of the call, notifying at least the second E-MBMS bearer used in the second MBSFN area to the UE.

12. The method of claim 1, further comprising:
the infrastructure device allocating a third E-MBMS bearer within the first or the second MBSFN area, to provide the media content to the UE, the first, second and third E-MBMS bearers providing the same media content to the UE, offset in time,
whereby the UE can employ application layer time-diversity reception to the received media content from the first and third E-MBMS bearers.

13. The method of claim 1, further comprising the infrastructure device:
receiving an indication of a priority level of a call; and
assigning the first MBSFN area and the first E-MBMS bearer, and the second MBSFN area and the second E-MBMS bearer, also based on the priority level of the call.

14. The method of claim 13, further comprising the infrastructure device:
when the priority level of the call indicates that the call is an emergency call, allocating a third E-MBMS bearer within the first MBSFN area or the second MBSFN area to provide the media content to the UE, the third E-MBMS bearer providing the same media content to the UE as the first and second E-MBMS bearers, offset in time.

15. A method for a User Equipment (UE) to provide Multimedia Broadcast/Multicast Service (E-MBMS) service area location update information to an infrastructure device in a Third Generation Partnership Project (3GPP) compliant wireless communication system, the 3GPP compliant wireless communication system having a radio access network partitioned into a plurality of Multimedia Broadcast Single Frequency Network (MBSFN) areas, wherein each MBSFN area provides an E-MBMS transmission and supports a plurality of E-MBMS bearers for transporting media content streams to UEs, the method comprising:

receiving, by the UE, transmissions from at least two MBSFN areas, each transmission comprising an MBSFN Area Identification (MBSFN Area ID) for a different MBSFN area;
choosing, by the UE, a primary preferred MBSFN area and at least one secondary preferred MBSFN area, and notifying the infrastructure device of the 3GPP compliant wireless communication system of the primary preferred MBSFN area and the at least one secondary preferred MBSFN area; and
when the UE receives a call provided to a call group comprising the UE, the UE receives the call on at least a first E-MBMS bearer transmitted in a first MBSFN area and a second E-MBMS bearer transmitted in a second MBSFN area, wherein the first MBSFN area is one of the UE's primary preferred MBSFN area and at least one secondary preferred MBSFN area and the second MBSFN area is the other of the UE's primary preferred MBSFN area and at least one secondary preferred MBSFN area,
wherein the first and second E-MBMS bearers provide the same media content to the UE.

16. The method of claim 15, further comprising the UE:
notifying the infrastructure device about a purpose attribute, the purpose attribute being selected in dependence on a current need of the UE for at least one of Make Before Break (MBB) service and a coverage boost.

17. The method of claim 15, further comprising the UE receiving the media content using different Temporary Mobile Group Identifiers (TMGI) on the first E-MBMS bearer and the second E-MBMS bearer.

18. The method of claim 15, further comprising:
the first MBSFN area being the UE's primary preferred MBSFN area, and the second MBSFN area being the UE's secondary preferred MBSFN area;
the UE using application layer time-diversity reception to process the received media content, the UE receiving the same media content via each of the first and second E-MBMS bearers with a time offset between the media content transmissions on each of the first and second E-MBMS bearers.

19. The method of claim 15, further comprising:
determining whether a level of a received signal from each of at least three MBSFN areas exceeds a first threshold and a second threshold, the second threshold being greater than the first threshold;
only considering a received signal if it exceeds the first threshold;
when none of the at least three signals exceeds the second threshold:
choosing a primary preferred MBSFN area, a secondary preferred MBSFN area and a ternary preferred MBSFN area; and
notifying the infrastructure device about the primary preferred MBSFN area, the secondary preferred MBSFN area and the ternary preferred MBSFN area;
when at least one of the at least three signals exceeds the second threshold:
choosing the highest of the signals as a default MBSFN area; and
notifying the infrastructure device about the default MBSFN area.

* * * * *

UNITED STATES PATENT AND TRADEMARK OFFICE
CERTIFICATE OF CORRECTION

| | | |
|---|---|---|
| PATENT NO. | : 9,042,223 B2 | Page 1 of 1 |
| APPLICATION NO. | : 13/724039 | |
| DATED | : May 26, 2015 | |
| INVENTOR(S) | : Michael F. Korus et al. | |

It is certified that error appears in the above-identified patent and that said Letters Patent is hereby corrected as shown below:

IN THE TITLE PAGE:

On Page 3, in Item (56), under "OTHER PUBLICATIONS," in Column 2, Line 10, delete "Netowrks,"" and insert -- Networks," --, therefor.

IN THE DRAWINGS:

In FIG. 3, Sheet 3 of 12, delete "ONEMBSFN" and insert -- ONE MBSFN --, therefor.

IN THE SPECIFICATION:

In Column 2, Line 14, delete "industry terra" and insert -- industry term --, therefor.

In Column 4, Line 25, delete "at System" and insert -- at 100. System --, therefor.

In Column 5, Line 15, delete "the PIT" and insert -- the PTT --, therefor.

In Column 5, Line 51, delete "PIT services" and insert -- PTT services --, therefor.

In Column 6, Line 44, delete "PIT server," and insert -- PTT server, --, therefor.

In Column 7, Line 46, delete "In FIG. 3." and insert -- In FIG. 3, --, therefor.

In Column 9, Line 33, delete "area" and insert -- area. --, therefor.

In Column 14, Line 42, delete "area," and insert -- area; --, therefor.

Signed and Sealed this
Twenty-eighth Day of June, 2016

Michelle K. Lee
*Director of the United States Patent and Trademark Office*